(12) United States Patent
Higashikata et al.

(10) Patent No.: US 11,436,796 B2
(45) Date of Patent: Sep. 6, 2022

(54) THREE-DIMENSIONAL SHAPE DATA PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Ryosuke Higashikata, Kanagawa (JP); Tomonari Takahashi, Kanagawa (JP); Naoki Hiji, Kanagawa (JP); Yasuyuki Tanaka, Kanagawa (JP); Taro Yokose, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/984,948

(22) Filed: Aug. 4, 2020

(65) Prior Publication Data
US 2021/0295597 A1 Sep. 23, 2021

(30) Foreign Application Priority Data
Mar. 23, 2020 (JP) .............................. JP2020-051913

(51) Int. Cl.
*G06T 17/10* (2006.01)
*G06T 17/20* (2006.01)
*G06T 1/20* (2006.01)

(52) U.S. Cl.
CPC ................ *G06T 17/10* (2013.01); *G06T 1/20* (2013.01); *G06T 17/20* (2013.01)

(58) Field of Classification Search
None
See application file for complete search history.

(56) References Cited

U.S. PATENT DOCUMENTS

| 6,930,682 | B1 * | 8/2005 | Livingston | .............. G06T 17/20 345/420 |
| 2004/0193391 | A1 * | 9/2004 | Balmelli | ................. G06T 17/20 703/2 |
| 2021/0225074 | A1 * | 7/2021 | Meilland | ................. G06T 17/20 |

OTHER PUBLICATIONS

Lorensen et al, 'Marching Cubes: A High Resolution 3D Surface Construction Algorithm', Computer Graphics, 21(4), pp. 163-169. (Year: 1987).*

(Continued)

*Primary Examiner* — Patrick F Valdez
(74) *Attorney, Agent, or Firm* — Oliff PLC

(57) ABSTRACT

A three-dimensional shape data processing apparatus includes a processor. The processor receives three-dimensional shape data represented by dividing a space including an object into plural three-dimensional regions, at least one of the plural three-dimensional regions having a size different from another three-dimensional region, extracts from the space a unit shape formed in which a predetermined position in each of the three-dimensional regions included in a three-dimensional region group formed of three-dimensional regions adjacent to each other is defined as a vertex, without missing or repeating any unit shape, and configures a surface of the object as a formation face represented by a flat face, based on each of the extracted unit shapes.

16 Claims, 22 Drawing Sheets

(56) References Cited

OTHER PUBLICATIONS

Montani et al, 'Discretized Marching Cubes', Proc. Visualization '94. (Year: 1994).*
Weber et al., 'Extraction of Crack-free Isosurfaces from Adaptive Mesh Refinement Data', Hierarchical and Geometrical Methods in Scientific Visualization, pp. 19-40, Springer-Verlag. (Year: 2003).*
Saito; "Multi-resolution Marching-Cubes;" 2001; pp. 1-17; Faculty of Environmental Information, Keio University, Japan.

* cited by examiner

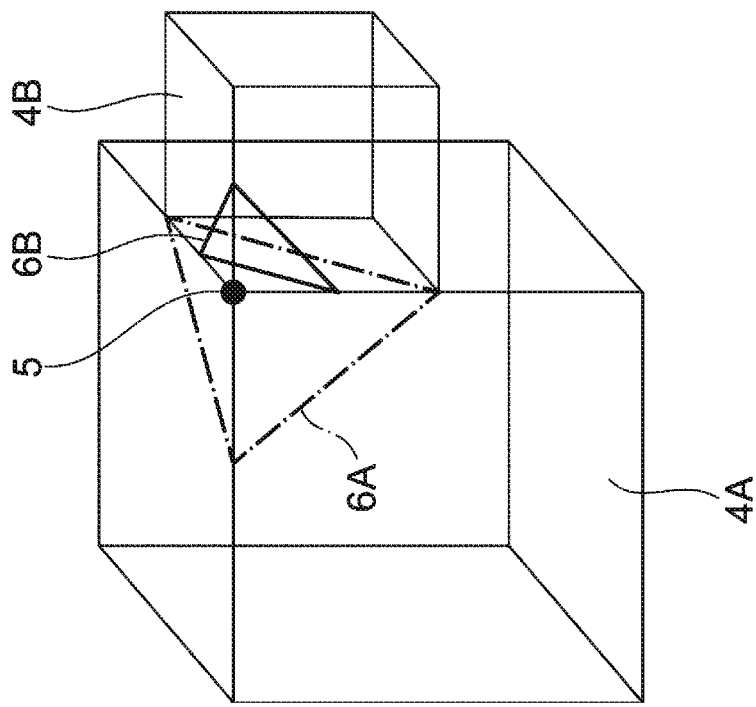
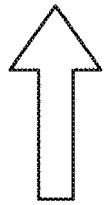
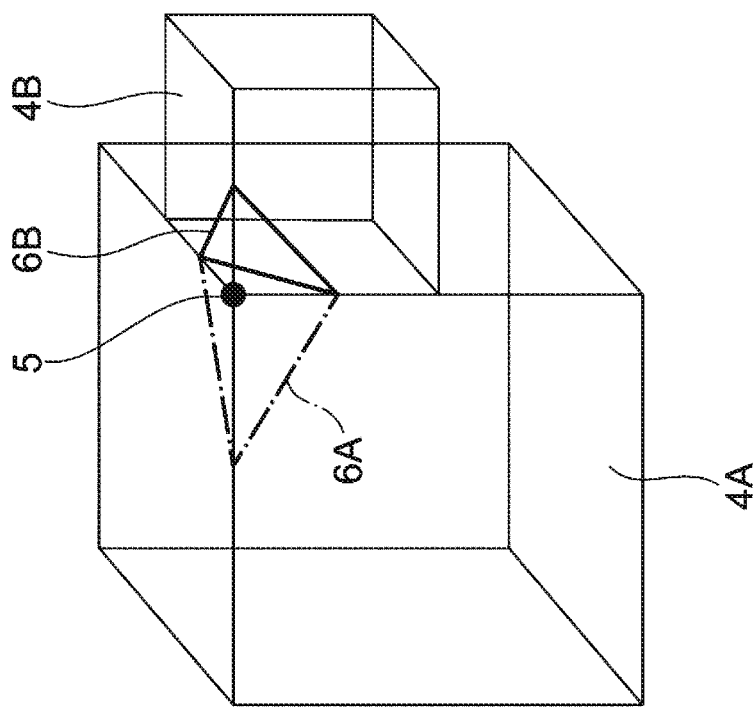
FIG. 6

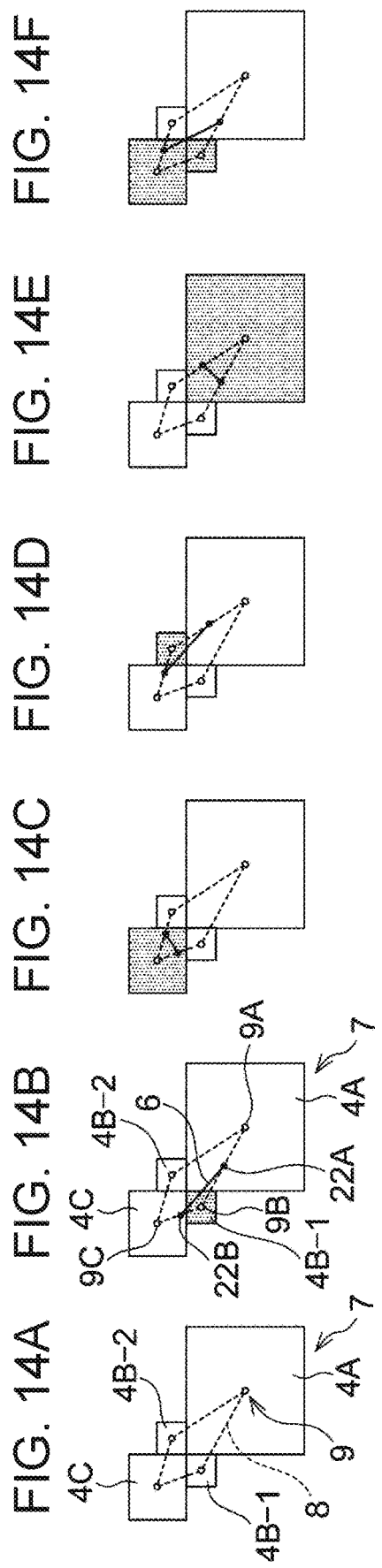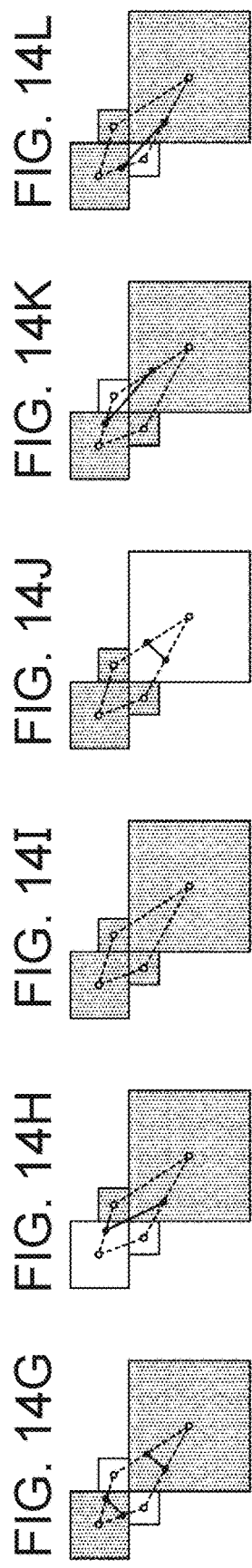

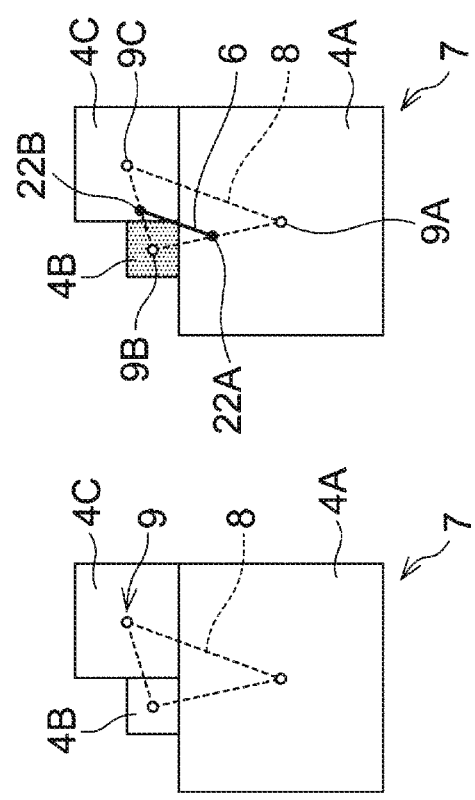

THREE-DIMENSIONAL SHAPE DATA PROCESSING APPARATUS AND NON-TRANSITORY COMPUTER READABLE MEDIUM

CROSS-REFERENCE TO RELATED APPLICATIONS

This application is based on and claims priority under 35 U.S.C. 119 from Japanese Patent Application No. 2020-051913 filed Mar. 23, 2020.

BACKGROUND

(i) Technical Field

The present disclosure relates to a three-dimensional shape data processing apparatus and a non-transitory computer readable medium.

(ii) Related Art

A technique for locally adjusting accuracy of a generated polygon model by being able to use a marching cubes method for volume data including voxels of different resolutions is disclosed in Mitsuaki SAITO, "Multi-resolution Marching-Cubes", Faculty of Environmental Information, Keio University, Japan.

SUMMARY

Three-dimensional shape data including a combination of three-dimensional regions (called voxels) of the same size such as cuboids or cubes may be used to represent a three-dimensional shape of an object.

In the case where a three-dimensional shape of an object is represented by voxels, not only surfaces of the object but the internal state of the object is also represented. Accordingly, the memory capacity required to store the three-dimensional shape data is greater than, for example, three-dimensional shape data that defines only surfaces of an object by polygons. Thus, in order to reduce the data amount of three-dimensional shape data defined by voxels and the amount of data computation of the three-dimensional shape data, for example, a technique for changing the size of voxels composing an object according to a position in the object is used.

Meanwhile, in the case where a three-dimensional shape of an object is represented by voxels, surfaces of the object are also represented by the voxels. Therefore, it is difficult to smoothly represent surfaces of the object compared to the case where surfaces of the object are represented by polygons. Thus, three-dimensional shape data in which the size of voxels composing an object is changed according to a position in the object may be converted into three-dimensional shape data represented by polygons.

However, voxels used for three-dimensional shape data have different sizes. Thus, for example, in the case where a marching cubes (MC) method for applying a polygon to an attribute pattern of a voxel to generate a flat face is used for such conversion, an inconsistent part such as a gap may be generated between polygons.

Aspects of non-limiting embodiments of the present disclosure relate to providing a three-dimensional shape data processing apparatus and a non-transitory computer readable medium that are capable of configuring surfaces of an object such that an inconsistent part is not generated from the beginning even in a case where a three-dimensional shape of the object is represented by three-dimensional regions of different sizes.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a three-dimensional shape data processing apparatus including a processor. The processor receives three-dimensional shape data represented by dividing a space including an object into a plurality of three-dimensional regions, at least one of the plurality of three-dimensional regions having a size different from another three-dimensional region, extracts unit shapes from the space without missing or repeating any unit shape, the unit shapes each being formed by setting a predetermined position in each of the three-dimensional regions included in a three-dimensional region group formed of three-dimensional regions adjacent to each other as a vertex, and configures a surface of the object as a formation face represented by a flat face, based on each of the extracted unit shapes.

BRIEF DESCRIPTION OF THE DRAWINGS

Exemplary embodiments of the present disclosure will be described in detail based on the following figures, wherein:

FIG. 6 is a diagram illustrating an example of correction of polygons including an inconsistent part;

FIGS. 14A to 14P are plan views illustrating examples of a pattern of allocation of a polygon to a unit shape having eight vertices;

FIGS. 15A to 15H are plan views illustrating examples of a pattern of allocation of a polygon to a unit shape having only less than eight vertices;

DETAILED DESCRIPTION

Hereinafter, exemplary embodiments will be described with reference to drawings. The same component elements and the same processes will be referred to with the same reference signs throughout the drawings, and redundant explanation will not be provided.

Figure 1:
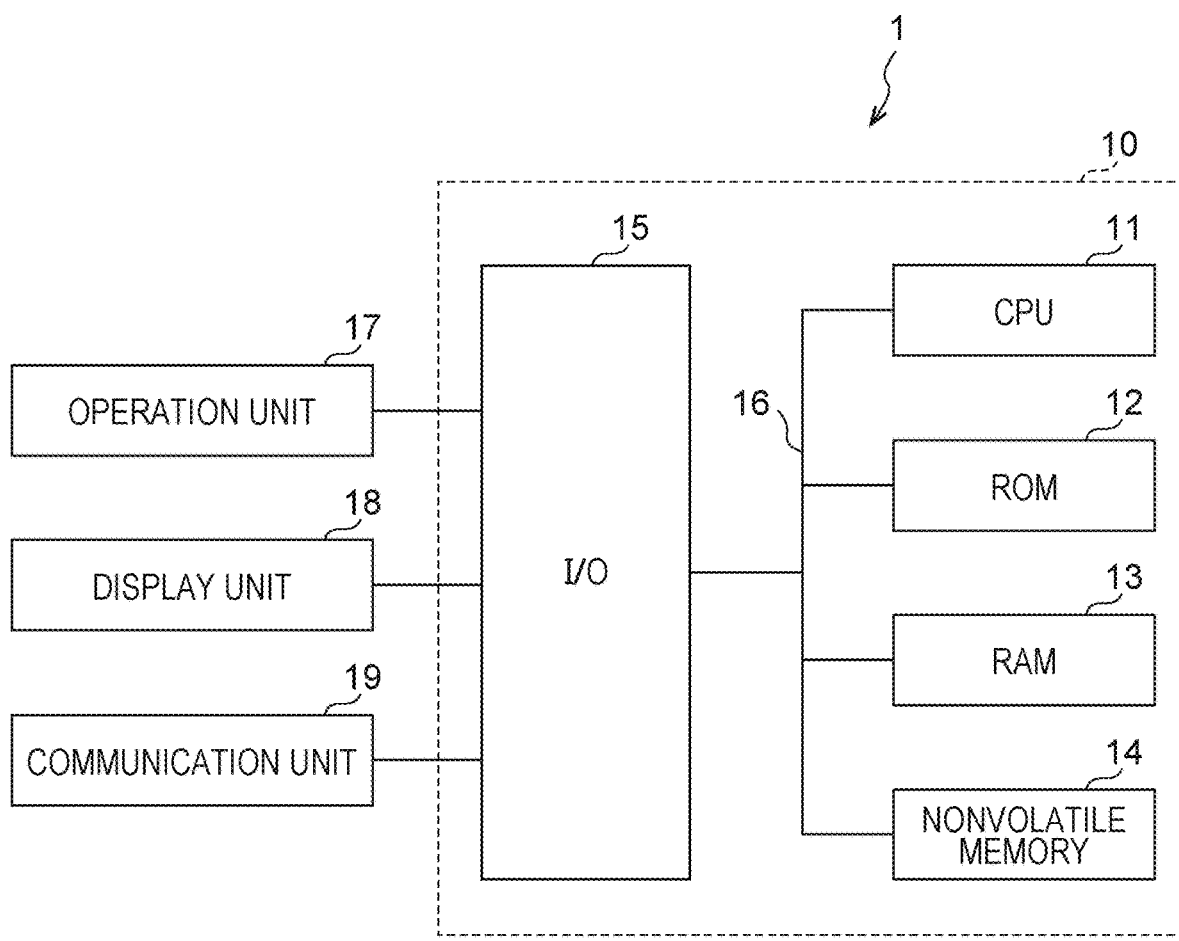
FIG. 1 is a diagram illustrating an example of the configuration of a three-dimensional shape data processing apparatus.

First, a configuration of a three-dimensional shape data processing apparatus 1 (hereinafter, referred to as a "processing apparatus 1") according to an exemplary embodiment will be described with reference to FIG. 1.

The processing apparatus 1 is, for example, a computer 10. The computer 10 includes a central processing unit (CPU) 11, which is an example of a processor, a read only memory (ROM) 12, a random access memory (RAM) 13, a nonvolatile memory 14, and an input/output interface (I/O) 15. The CPU 11, the ROM 12, the RAM 13, the nonvolatile memory 14, and the I/O 15 are connected to one another via a bus 16. Furthermore, an operation unit 17, a display unit 18, and a communication unit 19 are connected to the I/O 15.

The nonvolatile memory 14 is an example of a memory device in which stored information is maintained even when electric power supplied to the nonvolatile memory 14 is interrupted. For example, a semiconductor memory is used as the nonvolatile memory 14. However, a hard disk may be used as the nonvolatile memory 14. The nonvolatile memory 14 is not necessarily built in the computer 10. The nonvolatile memory 14 may be, for example, a portable memory device that is removable from the computer 10, such as a memory card.

The operation unit 17 is a functional unit that receives an instruction from a user of the processing apparatus 1. The operation unit 17 includes, for example, an input device such as a mouse, a keyboard, and a touch panel.

The display unit 18 is a functional unit that displays information processed by the CPU 11. The display unit 18 includes, for example, a display device such as a liquid crystal display, an organic electroluminescence (EL) display, or a projector.

The communication unit 19 includes, for example, an interface that is connected to a communication line such as the Internet or an in-house local area network (LAN) and performs data communication with an external apparatus connected to the communication line.

Figure 2:
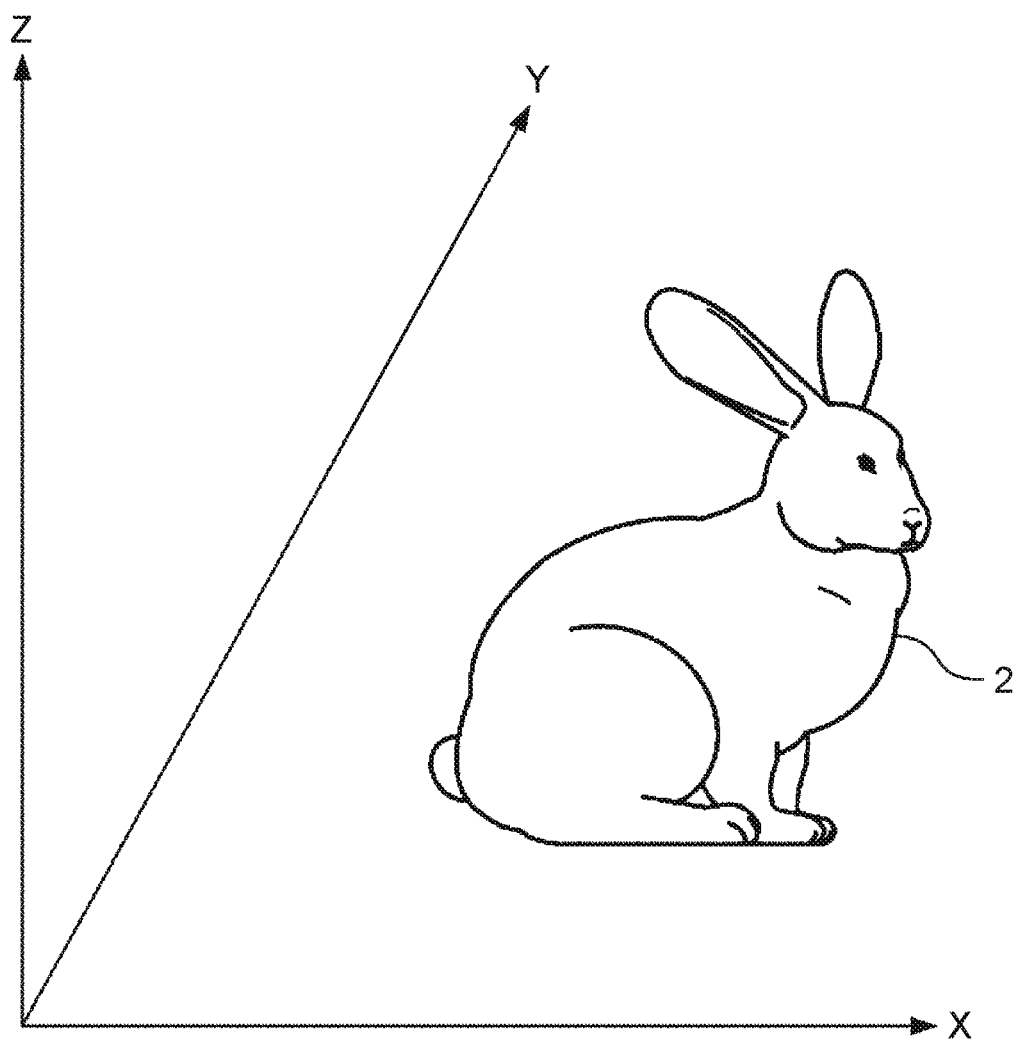
FIG. 2 is a diagram illustrating an example of a three-dimensional shape of an object.

FIG. 2 is a diagram illustrating an example of a three-dimensional shape of an object 2. The three-dimensional shape of the object 2 is represented using three-dimensional coordinates represented by an X axis, a Y axis, and a Z axis. Hereinafter, a position in space will be specified by three-dimensional coordinates, and the three-dimensional shape of the object 2 will be simply referred to as the "shape of the object 2".

The processing apparatus 1 uses, for example, data representing the shape of the object 2 using voxels 4, as three-dimensional shape data representing the shape of the object 2.

Figure 3:
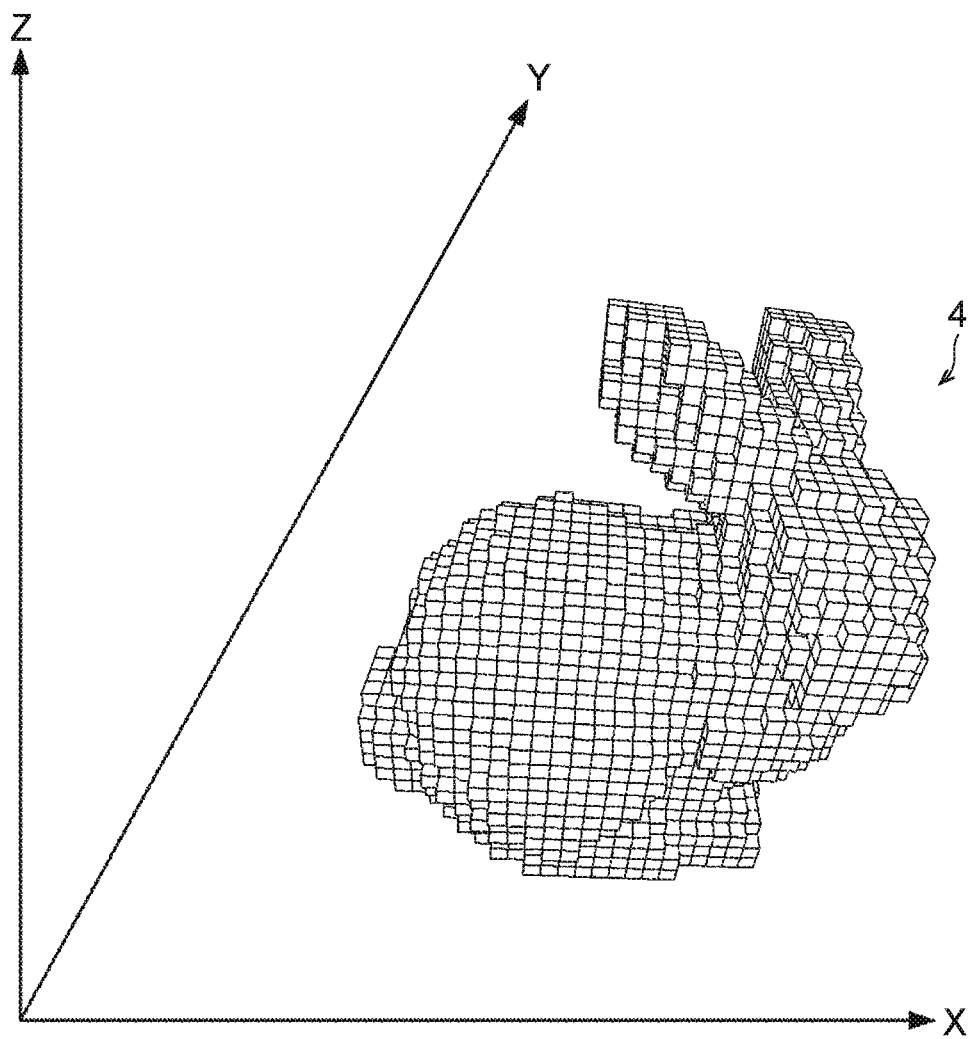
FIG. 3 is a diagram illustrating an example of a three-dimensional shape of an object composed of voxels.

FIG. 3 is a diagram illustrating an example in which the shape of the object 2 illustrated in FIG. 2 is represented by three-dimensional shape data composed of the voxels 4.

The voxels 4 each represent a three-dimensional region obtained by dividing a space. The voxels 4 may be, for example, cubes. However, the voxels 4 are not necessarily cubes but may be other three-dimensional regions such as cuboids, triangular pyramids, spheres, and cylinders. The shape of the object 2 is represented by a set of voxels 4 interfering with the object 2. A state in which "a voxel 4 interferes with the object 2" represents a state in which part of the object 2 is in contact with or included in the voxel 4. A voxel 4 interfering with the object 2 will be referred to as an "ON-state voxel 4", and a voxel 4 not interfering with the object 2 will be referred to as an "OFF-state voxel 4". That is, the shape of the object 2 is represented by a set of ON-state voxels 4. The space where the object 2 is present is divided in units of voxels 4. Thus, not only the ON-state voxels 4 but the OFF-state voxels 4 are also present in the space.

As described above, for example, a voxel 4 with only its surface being in contact with the object 2 may be treated as an ON-state voxel 4. Hereinafter, however, for example, a voxel 4 with its center interfering with the object 2 will be treated as an ON-state voxel 4, and a voxel 4 with only its surface interfering with the object 2 will be treated as an OFF-state voxel 4.

By stacking the ON-state voxels 4 as described above, a three-dimensional shape of the object 2 is represented in a desired manner. Furthermore, for example, attributes representing characteristics of each voxel 4 such as color, strength, material, texture, and the like may be set for the voxel 4. The color, material, and the like of the object 2 are represented by attributes of the ON-state voxels 4. Furthermore, information of surroundings of the object 2, such as information of illuminance, air current, and the like, is represented by attributes of the OFF-state voxels 4. Information regarding the ON state and the OFF state are also examples of attributes of the voxels 4.

The shape of the object 2 is represented by a set of voxels 4. Specifically, for example, the shape of the object 2 is represented by element values associated with coordinates specifying positions in space. In the case where coordinates of the center point of a voxel 4 in the space are represented by (X,Y,Z), for example, an ON-state voxel 4 is represented by "(X,Y,Z)≤1" and an OFF-state voxel 4 is represented by "(X,Y,Z)=0". Thus, the shape of the object 2 is represented as described above. That is, three-dimensional shape data defining the shape of the object 2 using the voxels 4 includes element values of coordinates (X,Y,Z) representing a state of interference with the object 2 and attributes associated with the voxels 4.

The space where the object 2 is present is not necessarily represented by coordinates (X,Y,Z) but may be represented by, for example, an index number uniquely associated with coordinates (X,Y,Z). In this case, for example, a value "1", which is associated with an index number, represents a voxel 4 whose center point is at the position represented by the index number.

Furthermore, coordinates representing a position in space are not limited to three-dimensional orthogonal coordinates with the X, Y, and Z axes but may be, for example, polar coordinates with r and θ. In this case, as in the case where a space is represented by index numbers such as 1, 2, 3, and so on for individual pitches of the X, Y, and Z axes, index numbers may be associated with individual pitches of r and θ and values of 1 or more represented by index numbers may be specified, so that a state in which an ON-state voxel 4 is located at the position may be represented.

Meanwhile, in the case where the voxels 4 are stacked to represent the shape of the object 2, surfaces of the object 2 along curves are also represented by the voxels 4. Thus, compared to the case where surfaces of the object 2 are represented by polygons, it is difficult to represent smooth surfaces.

Thus, when emphasis is placed on similarity between the actual shape of the object 2 and the shape of the object 2 represented by three-dimensional shape data, for example, three-dimensional shape data of the object 2 composed of the voxels 4 may be converted into three-dimensional shape data of the object 2 composed of polygons in accordance with a known algorithm for allocating polygons to surfaces of the object 2 composed of the voxels 4 using the MC method.

Figure 4:
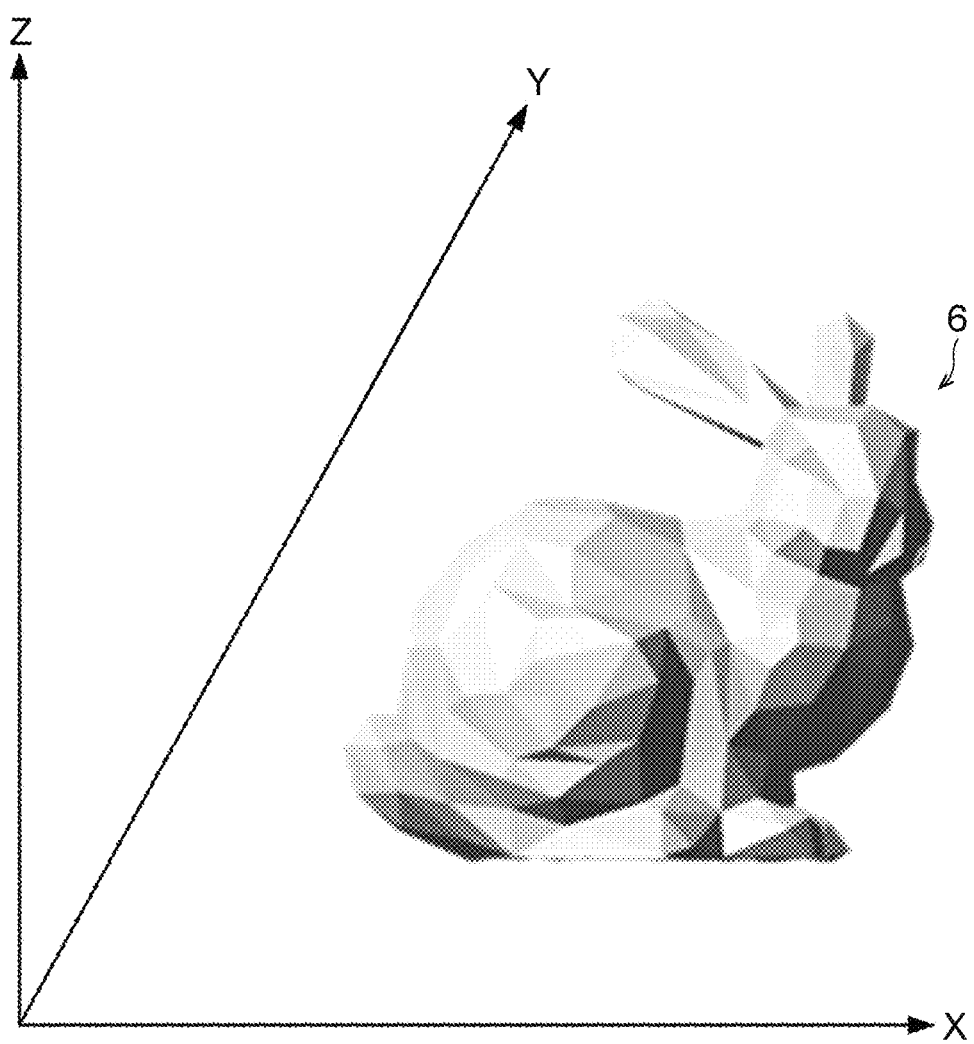
FIG. 4 is a diagram illustrating an example of a three-dimensional shape of an object composed of polygons.

FIG. 4 is a diagram illustrating an example in which the shape of the object 2 illustrated in FIG. 2 is represented by three-dimensional shape data composed of polygons 6.

The polygons 6 are formation faces configuring surfaces of the object 2. There is no constraint on the shape of the polygons 6. For example, polygons such as a triangle and a rectangle are used. The shape of the object 2 is configured by combining a plurality of polygons 6 along surfaces of the object 2. That is, three-dimensional shape data defining the shape of the object 2 using the polygons 6 includes, for example, the position and orientation of each of the polygons 6, information regarding connection between polygons 6 that are adjacent to each other, and the like. The polygons 6 are not necessarily flat faces but may be curved faces. Hereinafter, for example, the polygons 6 are flat faces.

As described above, in the case where the shape of the object 2 is represented by three-dimensional shape data composed of the voxels 4, information, such as color and material of the object 2 and stress applied to the object 2, corresponding to each of the voxels 4 may be stored and used as attributes of the voxel 4.

For example, in the case where the object 2 is analyzed based on three-dimensional shape data of the object 2 composed of the voxels 4, when the three-dimensional shape data of the object 2 is a high-precision model including attributes of more positions, more detailed analysis may be performed. For more detailed analysis, the sizes of the voxels 4 into which space is divided may be reduced as much as possible so that the number of voxels 4 per unit volume, that is, the density of voxels, may be increased.

However, in accordance with a decrease in the sizes of the voxels 4, the data amount of three-dimensional shape data increases. The increase in the data amount of three-dimensional shape data brings an impact on the capacity of the RAM 13 and the nonvolatile memory 14 of the processing apparatus 1, and a longer time is thus required for processing the three-dimensional shape data at the processing apparatus 1. Therefore, in the processing apparatus 1, instead of uniformly dividing the entire space into voxels 4 of the same size, a part in which the influence of low density of associated attributes exerted on analysis of the object 2 is small is divided into voxels 4 with a size larger than the other voxels 4, and a part in which a detailed analysis result is desired is divided into voxels 4 with a size smaller than the other voxels 4. Accordingly, three-dimensional shape data of the object 2 that has been taken into account the balance between analysis accuracy, processing time, and data amount may be obtained.

In this case, by allowing an attribute representing the size of a voxel to be associated with each of the voxels 4, the size of the voxel 4 may be represented.

Meanwhile, in the case where the sizes of the voxels 4 into which space is divided are different, when the MC method is used for converting three-dimensional shape data of the object 2 composed of the voxels 4 into three-dimensional shape data of the object 2 composed of the polygons 6, an inconsistent part may be generated on a surface of the object 2. The inconsistent part represents a part in which a gap occurs between adjacent polygons 6 composing a surface of the object 2, the polygons 6 intersect with each other, or the polygons 6 are bent to overlap with each other.

Figure 5:
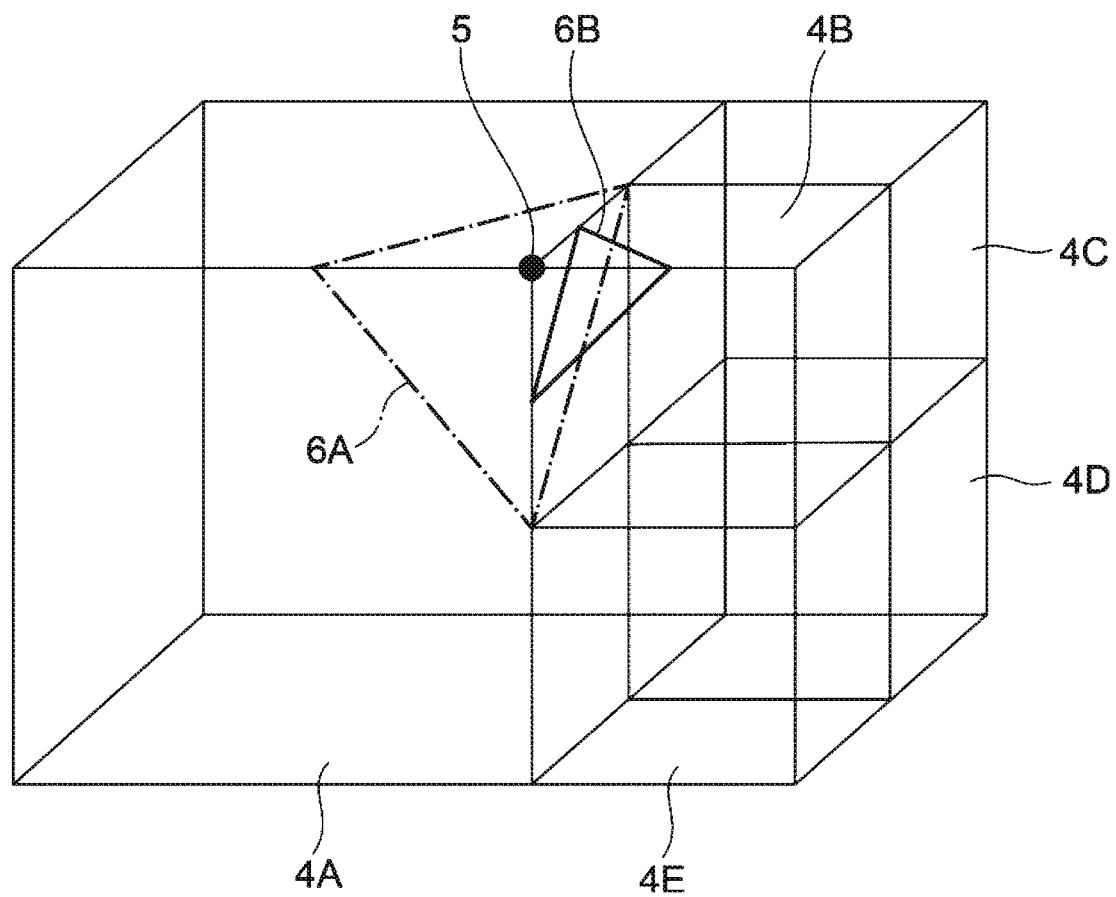
FIG. 5 is a diagram illustrating an example of polygons including an inconsistent part.

FIG. 5 is a diagram illustrating an example of the polygons 6 including an inconsistent part. In the example of FIG. 5, a voxel 4A and voxels 4B, 4C, 4D, and 4E are present. The voxels 4B, 4C, 4D, and 4E have the same size and are smaller than the voxel 4A. For example, in the case where a polygon 6A and a polygon 6B are allocated to the voxel 4A and the voxel 4B, respectively, that surround a vertex 5 in accordance with the MC method, a gap may occur between the polygon 6A and the polygon 6B, as illustrated in FIG. 5.

In order to eliminate the gap between the polygons 6 that are adjacent to each other, for example, as illustrated in FIG. 6, two vertices of the polygon 6A that are in contact with the voxel 4B are moved along sides of the voxel 4A up to vertices of the polygon 6B positioned at the corresponding sides of the voxel 4A. However, in the case where the polygons 6 are first applied to the voxels 4 of different sizes in accordance with the MC method, an inconsistent part of the polygons 6 is detected, and the inconsistent part of the polygons 6 is then adjusted, more processing steps are required for conversion, and a longer processing time is thus required than the case where surfaces of the object 2 are configured without any inconsistent part of the polygons 6 being generated from the beginning. Furthermore, in the case where the numbers of polygons 6 positioned at the voxels 4A and 4B of different sizes are not the same, not only simply adjusting polygons but processing such as dividing or deleting the polygons 6 may also be required, and further inconsistency may occur.

In contrast, with the processing apparatus 1 performing processing described below, even in the case where the shape of the object 2 is represented by the voxels 4 of different sizes, surfaces of the object 2 are composed of the polygons 6 without any inconsistent part of the polygons 6 being generated from the beginning.

Figure 7:
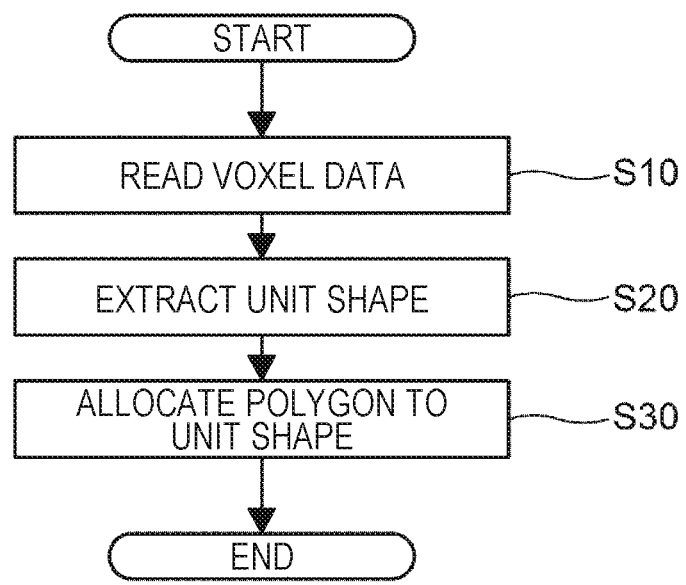
FIG. 7 is a flowchart illustrating an example of the flow of a three-dimensional shape data process.

FIG. 7 is a flowchart illustrating an example of the flow of a three-dimensional shape data process performed by the CPU 11 of the processing apparatus 1 in the case where the polygons 6 are allocated to surfaces of the object 2 that is represented by three-dimensional shape data composed of a plurality of voxels 4 at least one of which is smaller than another voxel 4 (hereinafter, simply referred to as "voxel data").

A three-dimensional shape data processing program that defines the three-dimensional shape data process is stored in advance, for example, in the ROM 12 of the processing apparatus 1. The CPU 11 of the processing apparatus 1 reads the three-dimensional shape data processing program stored in the ROM 12 and performs the three-dimensional shape data process.

Explanation will be provided based on the assumption that voxel data is stored in advance in the nonvolatile memory 14 and the CPU 11 acquires the voxel data from the nonvolatile memory 14. However, voxel data may be acquired by the communication unit 19 from an external apparatus connected to the communication line.

In step S10, the CPU 11 acquires voxel data stored in the nonvolatile memory 14 and stores the acquired voxel data into the RAM 13. Hereinafter, the CPU 11 performs processing on the voxel data stored in the RAM 13.

Figure 8:
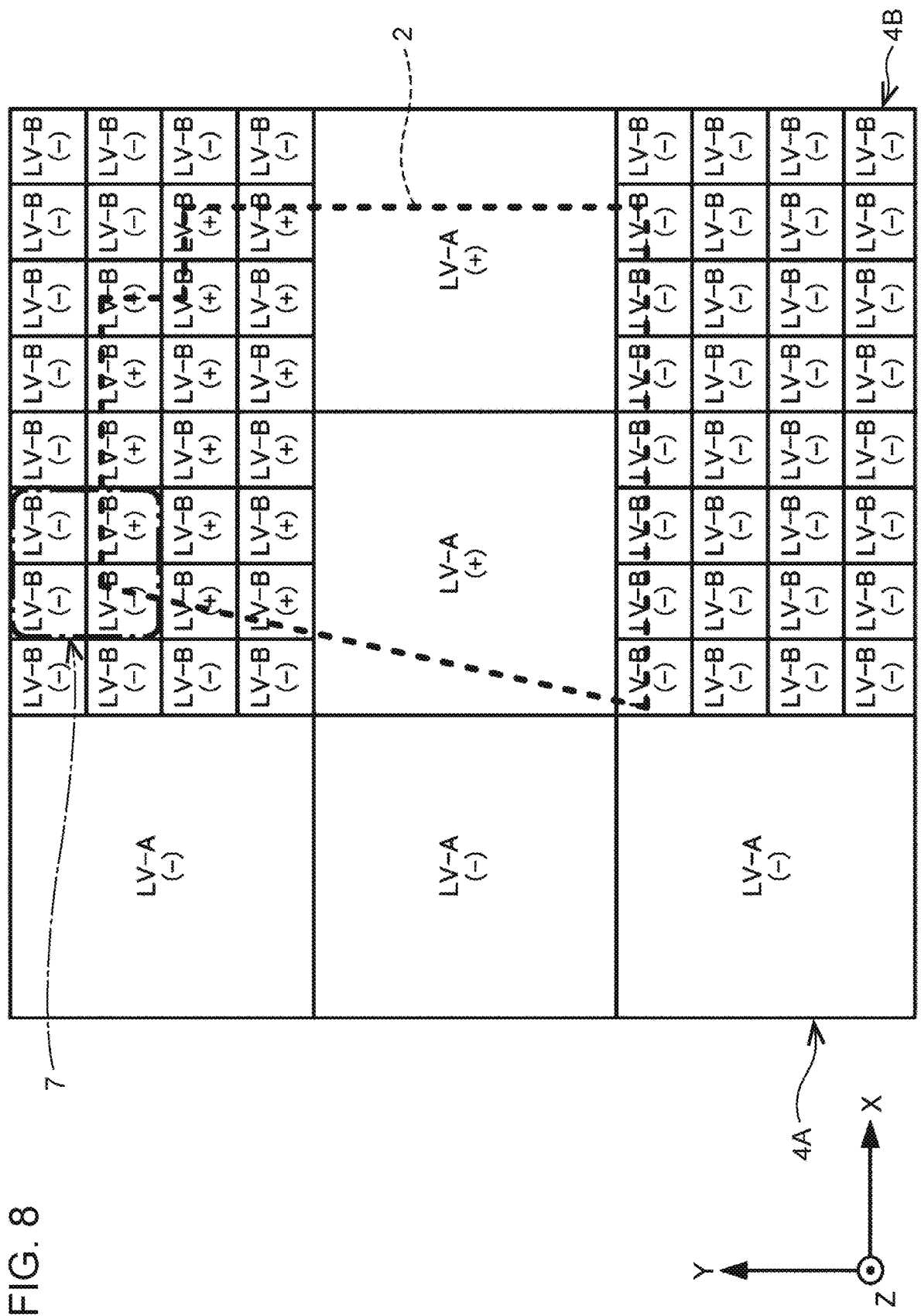
FIG. 8 is a diagram illustrating an example of voxel data.

FIG. 8 is a diagram illustrating an example of voxel data acquired from the nonvolatile memory 14. As described above, the object 2 is a solid, and the voxel 4A and the voxel 4B are three-dimensional regions (for example, cubes). For convenience of explanation, for example, arrangement of the object 2 and the voxels 4 on an XY plane passing through inside the object 2 in the case where the object 2 represented by voxel data and the voxels 4 are viewed from above (in the direction in which space is viewed in the origin direction along a Z-axis direction) is illustrated in FIG. 8. Hereinafter, such a diagram will be referred to as a plan view.

In the case where the voxels 4 need to be distinguished from one another for explanation, the voxels 4 are denoted as the voxel 4A and the voxel 4B, as described above. In the case where voxels 4 of different sizes do not need to be distinguished from one another for explanation, such as the voxel 4A and the voxel 4B, the voxels 4 will be are collectively denoted as "voxels 4".

Voxel data used for explanation includes two types of voxels 4 of different sizes, such as the voxels 4A at level A (in FIG. 8, represented by "LV-A") and the voxels 4B at level B (in FIG. 8, represented by "LV-B"). The voxels 4A are larger than the voxels 4B. For example, the voxels 4 of the same type are stacked in the Z-axis direction of the voxels 4 illustrated in FIG. 8. However, the voxels 4 of different types may be stacked. Furthermore, the voxels 4 of two types are illustrated in FIG. 8. However, the voxels 4 of three or more different sizes may be used, and there is no constraint on the sizes of the voxels 4.

Furthermore, an example in which voxels 4 with divisible ratios or voxels 4 of similar sizes are combined is illustrated in FIG. 8. However, the voxels 4 are merely an aspect representing three-dimensional regions, and other combinations are possible. For example, three-dimensional regions of different sizes and different shapes may be combined, or the voxels 4 may be three-dimensional regions formed in the case where points that are adjacent to each other in a group of points that are discretely distributed in a three-dimensional space are combined in a desired manner.

Signs of the voxels 4 each indicate a signed distance field (SDF) representing the positional relationship between the voxel 4 and the object 2. Specifically, the distance from the center point of the voxel 4 to the nearest surface of the object 2 is set as the size of the signed distance field of the voxel 4. In the case where the center point of the voxel 4 is inside the object 2, a positive sign is set for the distance. In the case where the center point of the voxel 4 is not inside the object 2, a negative sign is set for the distance. That is, a voxel 4 with a positive sign as the SDF is in the ON state, and a voxel 4 with a negative sign as the SDF is in the OFF state.

A standard for distance is not limited to the center point of the voxel 4. For example, a standard for distance may be the distance from a lattice point when the voxel 4 is regarded as a three-dimensional lattice to the nearest surface of the object 2. Alternatively, in the case where a three-dimensional region has a shape other than a cube, the centroid or the like may be used as a standard for distance.

Figure 9:
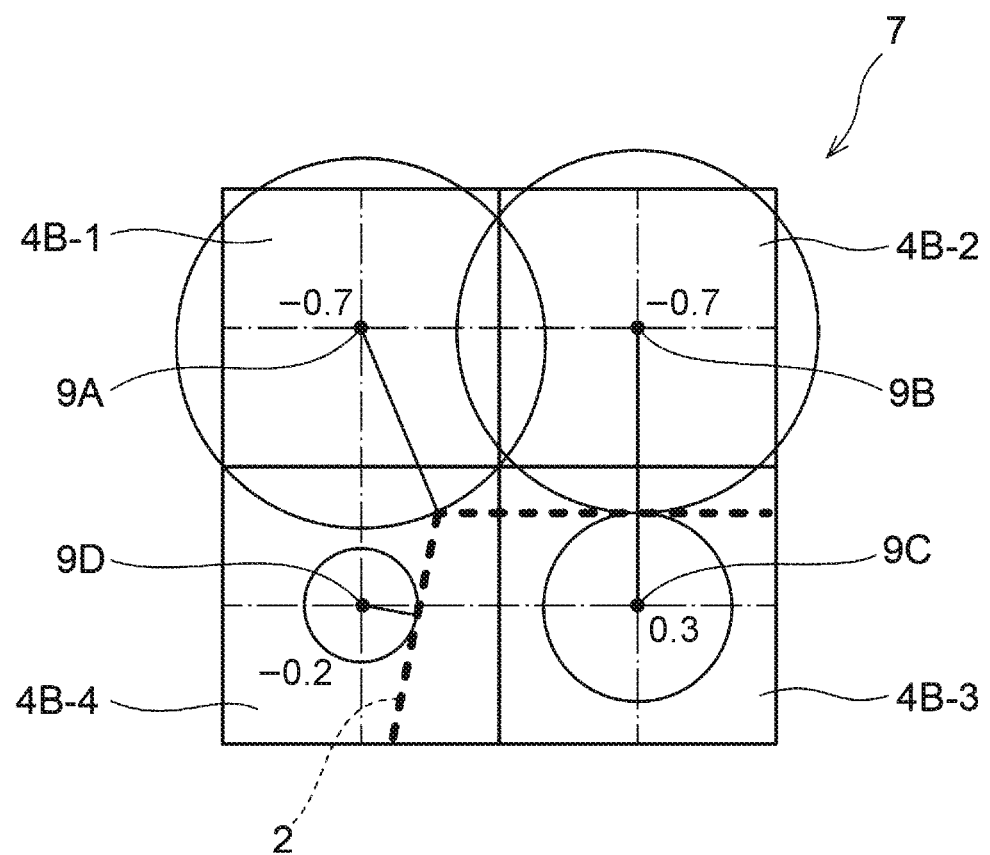
FIG. 9 is a diagram illustrating an example of a signed distance field (SDF)

FIG. 9 is a diagram of enlarged four voxels 4B-1, 4B-2, 4B-3, and 4B-4 included in a region 7 of FIG. 8.

Referring to FIG. 9, each of the distance from a center point 9A of the voxel 4B-1 to the nearest surface of the object 2 and the distance from a center point 9B of the voxel 4B-2 to the nearest surface of the object 2 is set to 0.7, the distance from a center point 9C of the voxel 4B-3 to the nearest surface of the object 2 is set to 0.3, and the distance from a center point 9D of the voxel 4B-4 to the nearest surface of the object 2 is set to 0.2. Furthermore, it is assumed that the center point 9C of the voxel 4B-3 is inside the object 2. In this case, the SDF of each of the voxels 4B-1 and 4B-2 is "−0.7", the SDF of the voxel 4B-3 is "0.3", and the SDF of the voxel 4B-4 is "−0.2".

Figure 10:
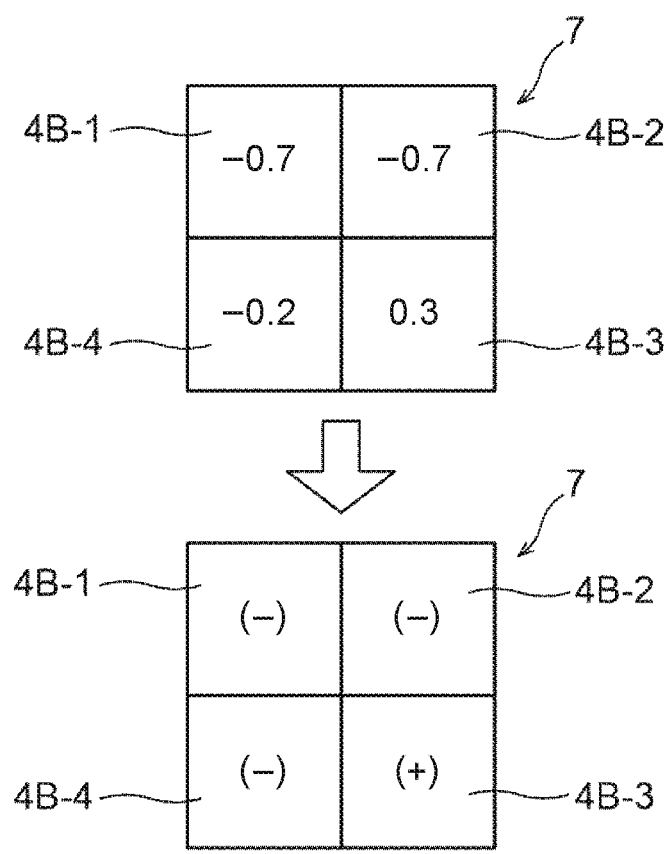
FIG. 10 is a diagram illustrating a display example of an SDF according to an exemplary embodiment.

FIG. 10 is a diagram in which attention is paid to the SDF of the four voxels 4B-1, 4B-2, 4B-3, and 4B-4 included in the region 7 in FIG. 8 calculated as described above. For each of the voxels 4 illustrated in FIG. 8, only sign of SDF of the voxel 4 is displayed, and the size of the SDF (hereinafter, referred to as an "absolute value of SDF") is omitted, as illustrated in FIG. 10. In actuality, however, an absolute value of SDF is associated with each of the voxels 4. The SDF is an example of attributes of the voxels 4.

Definition of signs of SDF may be opposite to the above explanation. For each of the voxels 4, distance without sign and information regarding being outside or inside the object 2 may be managed individually.

In step S20, the CPU 11 selects a determination region from the voxel data acquired in step S10. The determination region represents a unit of conversion in which conversion from the voxels 4 into polygons 6 is performed in accordance with the MC method. For example, the CPU 11 sets a range including eight voxels 4, that is, two voxels 4 in each of the X-axis direction, the Y-axis direction, and the Z-axis direction in a space, as a determination region. In the case where the region 7 illustrated in FIG. 8 is defined as a region including two voxels 4B in each of the X-axis direction, the Y-axis direction, and the Z-axis direction, the region 7 corresponds to the determination region. Thus, hereinafter, the region 7 will be referred to as a "determination region 7".

Figure 11:
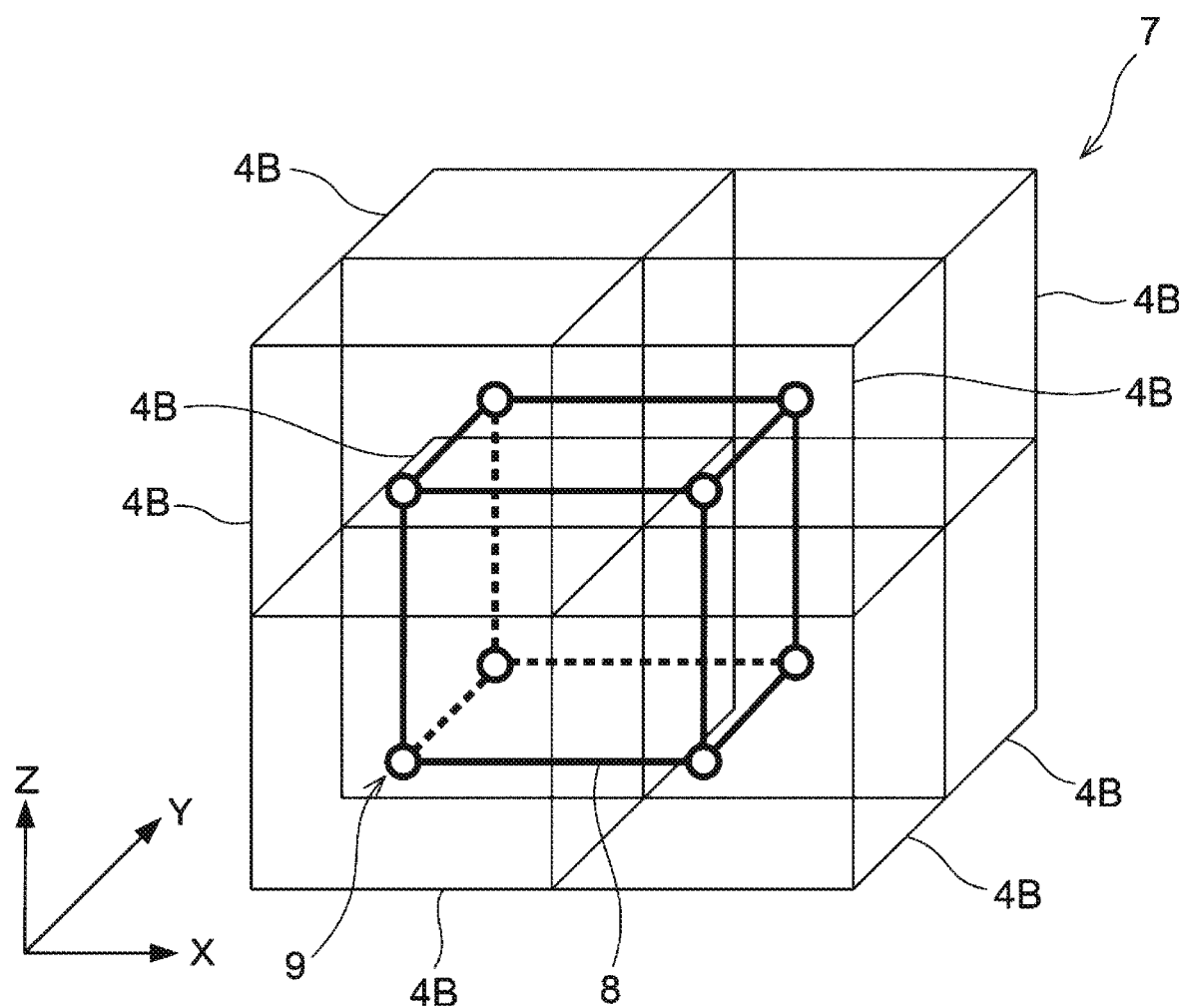
FIG. 11 is a diagram illustrating an example of a determination region composed of voxels of the same sizes.

FIG. 11 is a diagram illustrating an example of the determination region 7 composed of voxels 4B of the same size that are adjacent to each other. The CPU 11 sets, for the determination region 7, a shape in which a predetermined position in each of the voxels 4 included in the determination region 7 is defined as a vertex (hereinafter, referred to as a "unit shape 8"). There is no constraint on the positions of the vertices of the unit shape 8. However, for example, the CPU 11 sets the positions of the vertices of the unit shape 8 such that center points 9 of the individual voxels 4 are defined as vertices of the unit shape 8. Thus, for the determination region 7 composed of the eight voxels 4B, as illustrated in FIG. 11, a cube having the center points of the individual voxels 4B as vertices is the unit shape 8.

The vertices of the unit shape 8 are the center points 9 of the individual voxels 4. Thus, hereinafter, the vertices of the unit shape 8 will be referred to as "vertices 9".

The MC method may be used for the unit shape 8 having eight vertices, such as a cube. Therefore, by using the known MC method, the polygons 6 may be allocated to the unit shape 8.

However, voxels 4 of different sizes are present in the voxel data acquired in step S10, as illustrated in FIG. 8. Therefore, in the case where the border of the determination region 7 is set such that sizes of voxels 4 that are adjacent to each other in one of the X-axis direction, the Y-axis direction, and the Z-axis direction are different, the CPU 11 sets the determination region 7 taking into consideration similarity between the voxels 4 that are adjacent to each other.

Figure 12:
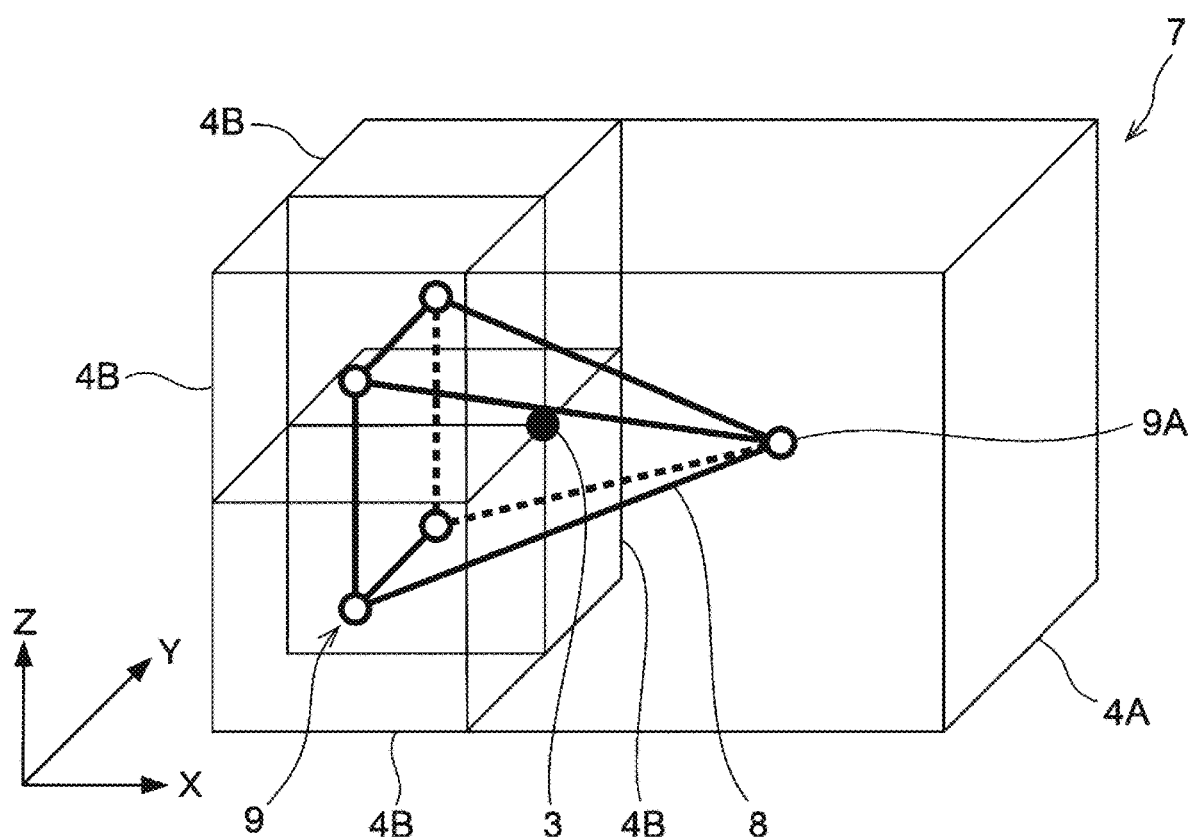
FIG. 12 is a diagram illustrating an example of a determination region composed of voxels of different sizes.

FIG. 12 is a diagram illustrating an example of the determination region 7 that has a border at which voxels 4 that are adjacent to each other in the X-axis direction have different sizes. When attention is paid to the four voxels 4B in FIG. 12, voxels 4B of the same size are adjacent to each other in the Y-axis direction and the Z-axis direction, whereas a voxel 4A of a different size is adjacent to the voxels 4B in the X-axis direction. The voxel 4 that is adjacent to each of the four voxels 4B in the X-axis direction is the same voxel 4A. In this case, the CPU 11 virtually regards the voxel 4A, which is actually the single voxel 4A, as voxels 4A that are adjacent to the individual voxels 4B and as voxels 4 that overlap with each other. Thus, it is regarded that two voxels 4 are included also in the X-axis direction, and the determination region 7 is thus configured as illustrated in FIG. 12.

In the case where the unit shape 8 is set for the determination region 7 illustrated in FIG. 12, the unit shape 8 is a quadrangular pyramid. As described above, the CPU 11 may handle a unit shape 8 that has eight vertices such as a cube or a unit shape 8 that has less than eight vertices such as quadrangular pyramid.

In the case where the unit shape 8 has less than eight vertices, the MC method is not able to be used for the unit shape 8. Therefore, the CPU 11 handles the vertices 9 of the unit shape 8 as described later. For example, the CPU 11 uses the MC method by regarding the unit shape 8 with less than eight apparent vertices such as a quadrangular pyramid as having eight vertices, so that conversion from voxel data into polygon data may be performed. Polygon data represents three-dimensional shape data composed of the polygons 6.

In order to perform conversion from voxel data into polygon data, the CPU 11 needs to extract all the unit shapes 8 having different types of shape from the voxel data without missing or repeating any unit shape. Thus, the CPU 11 sets the determination region 7 such that extraction of unit shapes is performed for voxel data without missing or repeating any unit shape.

Specifically, the CPU 11 extracts, as reference vertices, vertices of voxels 4 that are not positioned on the outer contour from among all the voxels 4 composing the voxel data acquired in step S10. Vertices of voxels 4 that are not positioned on the outer contour represent vertices that are not exposed to the outermost part of a set of voxels, that is, vertices that are not exposed to surfaces of the set of voxels, in the case where the voxels 4 into which the space is divided are regarded as a single set of voxels. In the example of FIG. 12, vertices surrounded by voxels 4 in the X-axis direction, the Y-axis direction, and the Z-axis direction are defined as reference vertices 3.

Figure 13:
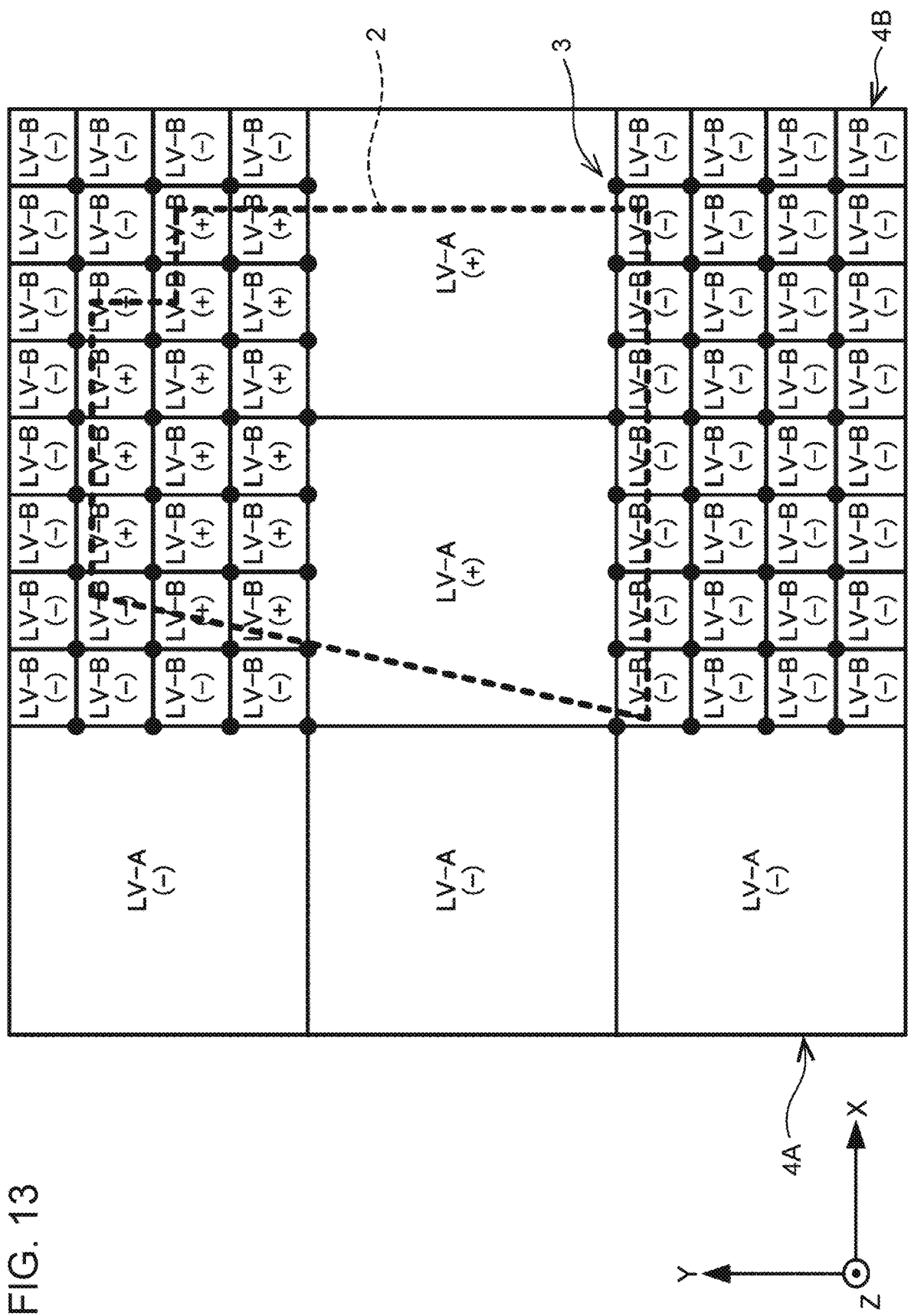
FIG. 13 is a diagram illustrating an example of reference vertices extracted from voxel data.

The CPU 11 sequentially scans all the voxels 4 composing the voxel data to extract all the reference vertices 3 included in the voxel data in accordance with positional relationship between the voxels 4. FIG. 13 is a diagram illustrating a state in which the reference vertices 3 are extracted from the voxel data illustrated in FIG. 8.

After extracting all the reference vertices 3 from the voxel data, the CPU 11 sets, for each of the reference vertices 3, all the voxels 4 that are in contact with the reference vertex 3 as the determination region 7 corresponding to the reference vertex 3. In the example of FIG. 12, the voxel 4A and the four voxels 4B are in contact with the reference vertex 3. Thus, a range including the voxels 4 illustrated in FIG. 12 is defined as the determination region 7. As described above, the determination region 7 composed of the voxels 4 that are in contact with the reference vertex 3 is an example of a three-dimensional region group.

After that, by extracting the unit shape 8 for each determination region 7, the CPU 11 extracts the unit shapes 8 from the voxel data without missing or repeating any unit shape. Extracting a unit shape 8 repeatedly represents a case where the unit shapes 8 that completely overlap are extracted or a case where the unit shapes 8 part of which overlap are extracted.

After the unit shape 8 is extracted from the voxel data in step S20 of FIG. 7, the CPU 11 allocates a polygon 6 to the extracted unit shape 8, so that a surface of the object 2 represented by the voxel data is formed of the polygon 6 in step S30.

The CPU 11 uses the MC method for allocation of the polygon 6 to the unit shape 8. That is, the CPU 11 generates a flat face by allocating the polygon 6 having a shape in which the midpoint of a side that connects vertices 9 of the unit shape 8 is defined as a new vertex (referred to as an "MC vertex") to the unit shape 8 on the basis of a state pattern of the voxels 4 composing the determination region 7 from which the unit shape 8 is extracted and achieving consistency. A state pattern of voxels 4 represents a pattern of combination of the ON state and the OFF state of a plurality of voxels 4.

FIGS. 14A to 14P are plan views illustrating examples of allocation patterns in the case where a polygon 6 is allocated to the unit shape 8 on the basis of state patterns of the voxels 4 composing the determination region 7 from which the unit shape 8 having the eight vertices 9 is extracted. The determination region 7 illustrated in FIG. 14 includes three types of voxels of different sizes: the voxel 4A, the voxels 4B, and the voxel 4C. The determination region 7 includes the two voxels 4B, one of them being represented by a voxel 4B-1 and the other being represented by a voxel 4B-2.

There are sixteen combinations of state patterns of the four voxels 4. FIGS. 14A to 14P illustrate the state patterns of the voxels 4. For example, a voxel 4 illustrated as a shaded voxel such as the voxel 4B-1 in FIG. 14B represents an ON-state voxel 4, and a voxel 4 illustrated as a non-shaded voxel such as the voxel 4B-2 in FIG. 14B represents an OFF-state voxel 4.

In FIGS. 14C to 14P, the same elements as those in FIGS. 14A and 14B are referred to with the same reference signs as those in FIGS. 14A and 14B. However, the reference signs are omitted in FIGS. 14C to 14P.

In FIGS. 14A to 14P, sixteen state patterns are illustrated based on the MC method. However, in principle, a polygon 6 is generated such that the midpoint of a line segment connecting the center point of an ON-state voxel 4 to a center point of an OFF-state voxel 4 is defined as an MC vertex. Thus, in the case where a combination of voxels 4 with indivisible ratios or voxels 4 of dissimilar sizes or a combination of voxels 4 (three-dimensional regions) of desired shapes other than cubes is used, all the possible state patterns do not need to be identified in advance. Allocation processing of a polygon 6 may be performed only on the basis of whether each of the vertices of the unit shape 8 formed based on the determination region 7 used is in the ON state or the OFF state.

The CPU 11 allocates a polygon 6 in which midpoints of sides each connecting the center point 9 of an ON-state voxel 4 to the center point 9 of an OFF-state voxel 4 are defined as MC vertices 22 to the unit shape 8, in accordance with each of the state patterns of the voxels 4 illustrated in FIGS. 14A to 14P.

For example, in FIG. 14B, the voxel 4B-1 is in the ON state, and the voxel 4A, the voxel 4B-2, and the voxel 4C are in the OFF state. Thus, the CPU 11 allocates a polygon 6 having an MC vertex 22A, which is the midpoint of a side connecting a center point 9B of the voxel 4B-1 to a center point 9A of the voxel 4A, and an MC vertex 22B, which is the midpoint of a side connecting the center point 9B of the voxel 4B-1 to a center point 9C of the voxel 4C, to the unit shape 8. For the other state patterns of the voxels 4 illustrated in FIGS. 14C to 14P, the CPU 11 also allocates a polygon 6 to the unit shape 8 in accordance with the method described above taking FIG. 14B as an example. For the state patterns of the voxels 4 illustrated in FIGS. 14A and 14I, the ON-state and OFF-state voxels 4 are not present in a mixed manner in the determination region 7. Thus, no polygon 6 is allocated to the unit shape 8 in FIGS. 14A and 14I.

In contrast, in the determination region 7 illustrated in FIG. 12, the same voxel 4A is adjacent to all the voxels 4B. Thus, the center points 9A of the voxels 4 that are adjacent to the voxels 4B are the same. Therefore, the unit shape 8 obtained from the determination region 7 illustrated in FIG. 12 is a quadrangular pyramid.

In such a case, the CPU 11 performs processing such that, regarding the vertices 9 of the unit shape 8, the voxel 4A adjacent to each of the voxels 4B is regarded as different voxels 4A that are adjacent to the voxels 4B on the voxel data. That is, the CPU 11 performs processing by regarding the voxel 4A as different voxels 4A that are virtually adjacent to the individual voxels 4B and regarding the center point 9A of the voxel 4A as center points that overlap with each other because the virtual voxels 4A are located at the same position, which making the apparent number of vertices 9 of the unit shape 8 to be less than eight.

Therefore, the CPU 11 regards the state in which the apparent number of vertices of the unit shape 8 is less than eight as a result of overlap of at least one vertex 9 of the unit shape 8 and another vertex 9 on data, and performs processing by regarding the unit shape 8 as actually having eight vertices 9. That is, in the unit shape 8 illustrated in FIG. 12, the center points 9A of the individual voxels 4A that are adjacent to the voxels 4B overlap. Thus, as a result of contraction of the sides connecting the center points 9A, the unit shape 8 only looks like a quadrangular pyramid.

By handling the vertices 9 of the unit shape 8 as described above, the CPU 11 also uses the MC method for the unit shape 8 whose apparent number of vertices is less than eight.

FIGS. 15A to 15H are plan views illustrating examples of allocation patterns in the case where a polygon 6 is allocated to the unit shape 8 on the basis of state patterns of the voxels 4 composing the determination region 7 from which the unit shape 8 apparently having less than eight vertices 9 is extracted. The determination region 7 illustrated in FIGS. 15A to 15H includes three types of voxels 4 of different sizes: the voxels 4A, 4B, and 4C.

There are eight state patterns of three voxels 4. Thus, FIGS. 15A to 15H illustrate the state patterns of the voxels 4. For example, a shaded voxel 4 such as the voxel 4B in FIG. 15B represents an ON-state voxel 4, and a non-shaded voxel 4 such as the voxel 4A in FIG. 15B represents an OFF-state voxel 4.

In FIGS. 15C to 15H, the same elements as those in FIGS. 15A and 15B are referred to with the same reference signs as those in FIGS. 15A and 15B. However, the reference signs are omitted in FIGS. 15C to 15H.

For example, in FIG. 15B, the voxel 4B is in the ON state, and the voxel 4A and the voxel 4C are in the OFF state. Therefore, the CPU 11 allocates a polygon 6 that has an MC vertex 22A, which is the midpoint of a side connecting the center point 9B of the voxel 4B to the center point 9A of the voxel 4A, and the MC vertex 22B, which is the midpoint of a side connecting the center point 9B of the voxel 4B to the center point 9C of the voxel 4C, to the unit shape 8. For the other state patterns of voxels 4 illustrated in FIGS. 15C to 15H, the CPU 11 also allocates a polygon 6 to the unit shape 8 in accordance with the method explained above taking FIG. 15B as an example. For the state patterns of the voxels 4 illustrated in FIGS. 15A and 15E, the ON-state and OFF-state voxels 4 are not present in a mixed manner in the determination region 7. Thus, no polygon 6 is allocated to the unit shape 8 in FIGS. 15A and 15E.

By performing the processing described above for all the unit shapes 8, the CPU 11 allows surfaces of the object 2 represented by voxel data to be composed of the polygons 6. Then, the three-dimensional shape data process illustrated in FIG. 7 ends.

Figure 16:
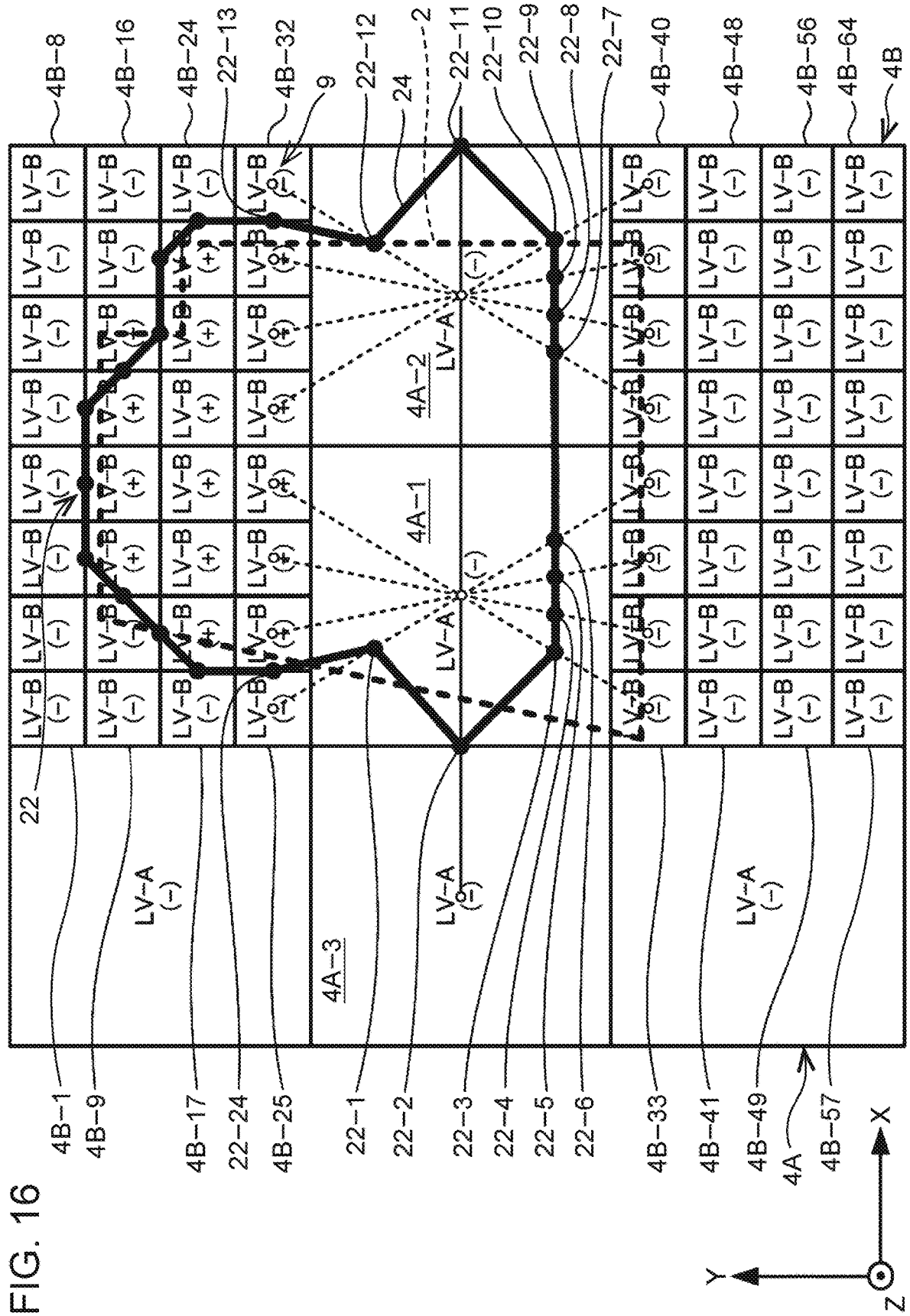
FIG. 16 is a diagram illustrating an example of an outline of an object represented by polygon data obtained by performing a three-dimensional shape data process.

FIG. 16 is a diagram illustrating an example of an outline 24 of the object 2 represented by polygon data, which is obtained by performing the three-dimensional shape data process illustrated in FIG. 7 for the voxel data illustrated in FIG. 13.

For convenience of explanation, three voxels 4A arranged in the X-axis direction in a middle part of FIG. 16 will be referred to as a voxel 4A-1, a voxel 4A-2, and a voxel 4A-3. Furthermore, voxels 4B arranged in the X-axis direction will be referred to as a voxel 4B-1, a voxel 4B-2, . . . , and a voxel 4B-64 in order from the upper left to the lower right in FIG. 16.

The outline 24 represents the shape of the object 2 composed of polygons 6 having MC vertices 22-1 to 22-24 as vertices, with respect to the actual shape of the object 2. The MC vertex 22-1 is positioned at the midpoint of a side connecting the center point 9 of the voxel 4B-25 to the center point 9 of the voxel 4A-1, and the MC vertex 22-2 is positioned at the midpoint of a side connecting the center point 9 of the voxel 4A-1 to the center point 9 of the voxel 4A-3. In a similar manner, the MC vertices 22-3 to 22-6 are positioned at midpoints of sides connecting the center point 9 of the voxel 4A-1 to the center points of the voxel 4B-33, the voxel 4B-34, the voxel 4B-35, and the voxel 4B-36, respectively, and the MC vertices 22-7 to 22-10 are positioned at midpoints of sides connecting the center point 9 of the voxel 4A-2 to the center points of the voxel 4B-37, the voxel 4B-38, the voxel 4B-39, and the voxel 4B-40, respectively. The MC vertex 22-11 is the midpoint of a line segment connecting the center point of an OFF-state voxel 4A, which is not illustrated in FIG. 16, adjacent to the voxel 4A-2 in the X-axis direction to the center point of the voxel 4A-2.

As described above, even in the case where the space where the object 2 is present is divided into voxels 4 of different sizes, the processing apparatus 1 is able to generate polygon data configuring surfaces of the object 2 such that no inconsistent part is generated from the beginning.

In the case where the MC method is used for the unit shape 8 whose apparent number of vertices is less than eight, a polygon 6 is allocated to the unit shape 8 while regarding a side connecting the overlapping vertices 9 of the unit shape 8 as being contracted. Thus, depending on the condition of contraction of a side, an element that does not formally have an area, such as a straight line or a point, may be allocated as a polygon 6. A polygon 6 is represented by being polygonal. Thus, strictly speaking, a straight line or a point that does not have an area is not a polygon 6. However, a polygon 6 that does not have an area may be regarded as being obtained when a polygon 6 that originally has an area becomes a polygon 6 that does not have an area in accordance with contraction of a side connecting overlapping vertices 9 of the unit shape 8. Thus, such a straight line or a point may be defined as a polygon 6 that does not have an area.

Figure 17:
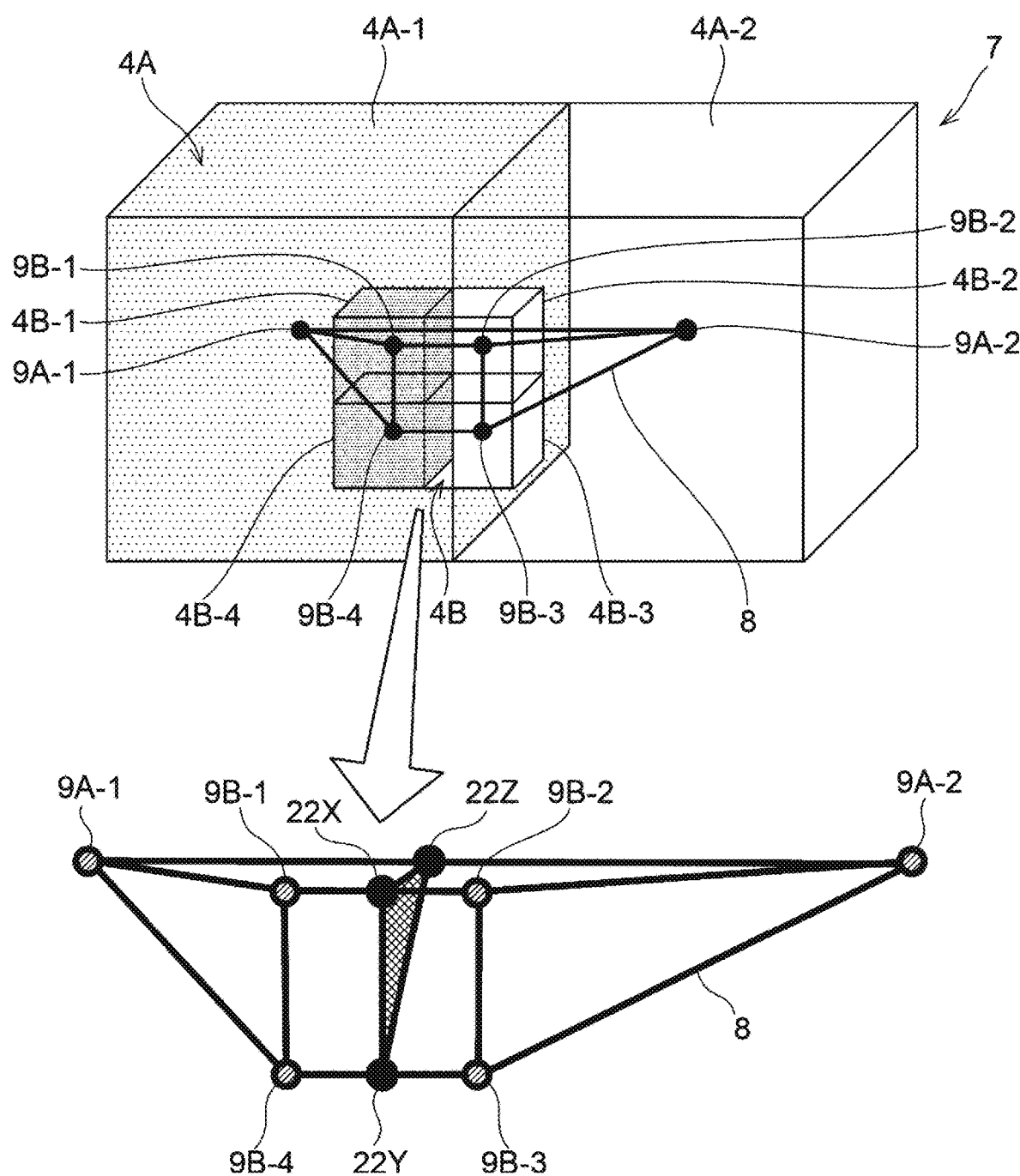
FIG. 17 is a diagram illustrating an example of a polygon having no area.

FIG. 17 is a diagram illustrating an example of generation of a polygon 6 that does not have an area as a result of conversion from voxel data into polygon data.

The determination region 7 illustrated in FIG. 17 is composed of the voxels 4A and the voxels 4B of different sizes. The voxels 4A, which are larger than the voxels 4B, include the voxel 4A-1 and the voxel 4A-2, and the voxels 4B include the voxel 4B-1, the voxel 4B-2, the voxel 4B-3, and the voxel 4B-4. In this case, the unit shape 8 illustrated in FIG. 17 in which the center point 9B-1 of the voxel 4B-1, the center point 9B-2 of the voxel 4B-2, the center point 9B-3 of the voxel 4B-3, the center point 9B-4 of the voxel 4B-4, the center point 9A-1 of the voxel 4A-1, and the center point 9A-2 of the voxel 4A-2 are defined as the vertices 9 is extracted from the determination region 7.

By defining the voxel 4A-1, the voxel 4B-1, and the voxel 4B-4 as the ON-state voxels 4 and defining the voxel 4A-2, the voxel 4B-2, and the voxel 4B-3 as the OFF-state voxels 4, the processing apparatus 1 allocates a triangular polygon 6 having a midpoint 22X of a side connecting the vertex 9B-1 to the vertex 9B-2 in the unit shape 8, a midpoint 22Y of a side connecting the vertex 9B-4 to the vertex 9B-3 in the unit shape 8, and a midpoint 22Z of a side connecting the vertex 9A-1 to the vertex 9A-2 in the unit shape 8 as vertices to the unit shape 8.

Figure 18:
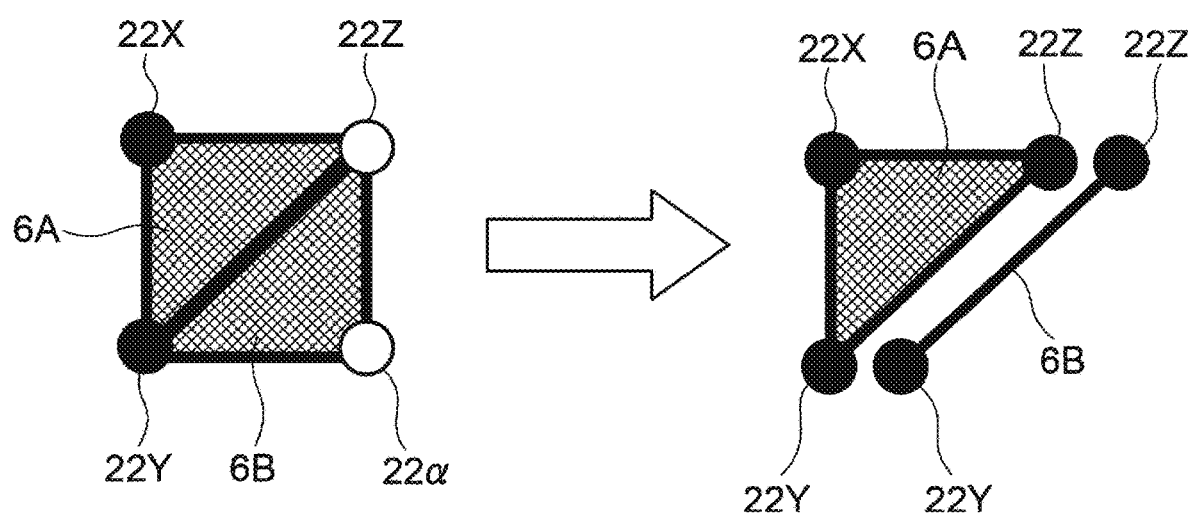
FIG. 18 is a diagram illustrating an example of a process of generation of a polygon having no area.

However, because both the voxel 4B-1 and the voxel 4B-4 are adjacent to the voxel 4A-1 and both the voxel 4B-2 and the voxel 4B-3 are adjacent to the voxel 4A-2, the processing apparatus 1 performs processing by regarding the voxel 4A-1 as different voxels 4A-1 that are adjacent to the voxel 4B-1 and the voxel 4B-4 on voxel data and regarding the voxel 4A-2 as different voxels 4A-2 that are adjacent to the voxel 4B-2 and the voxel 4B-3 on voxel data. Thus, on data, polygons 6A and 6B illustrated in FIG. 18 are allocated to the unit shape 8 illustrated in FIG. 17.

In contrast, in the virtual two voxels 4A-1 and two voxels 4A-2 existing on data processing, in accordance with overlap of the center point 9A-1 of one of the two voxels 4A-1 and the center point 9A-1 of the other voxel 4A-1 and overlap of the center point 9A-2 of one of the two voxels 4A-2 and the center point 9A-2 of the other voxel 4A-2, an MC vertex 22α and the MC vertex 22Z of the polygon 6B overlap. As a result, the polygon 6B is collapsed to a straight line connecting the MC vertex 22Y to the MC vertex 22Z. Thus, although only the polygon 6A is apparently present in the unit shape 8, the polygon 6B that is represented by a straight line is also allocated to the unit shape 8 on polygon data.

Thus, in the case where a polygon 6 that does not have an area is allocated to a unit shape 8, the CPU 11 deletes the polygon 6 that does not have an area from the unit shape 8.

In the case where the CPU 11 knows prior to generation of polygon data that a polygon 6 not having an area is to be generated, the CPU 11 may not allocate the polygon 6 not having an area to the unit shape 8.

<Modifications>

In the three-dimensional shape data process illustrated in FIG. 7, the polygon 6 in which the midpoint of a side of the unit shape 8 positioned at the border between an ON-state voxel 4 and an OFF-state voxel 4 is defined as the MC vertex 22 is allocated. Thus, as illustrated in FIG. 16, the actual shape of the object 2 may be different from the shape of the object 2 represented by polygon data. Thus, the processing apparatus 1 may convert voxel data into polygon data by the three-dimensional shape data process and then perform a polygon correction process for correcting the polygon data.

Figure 19:
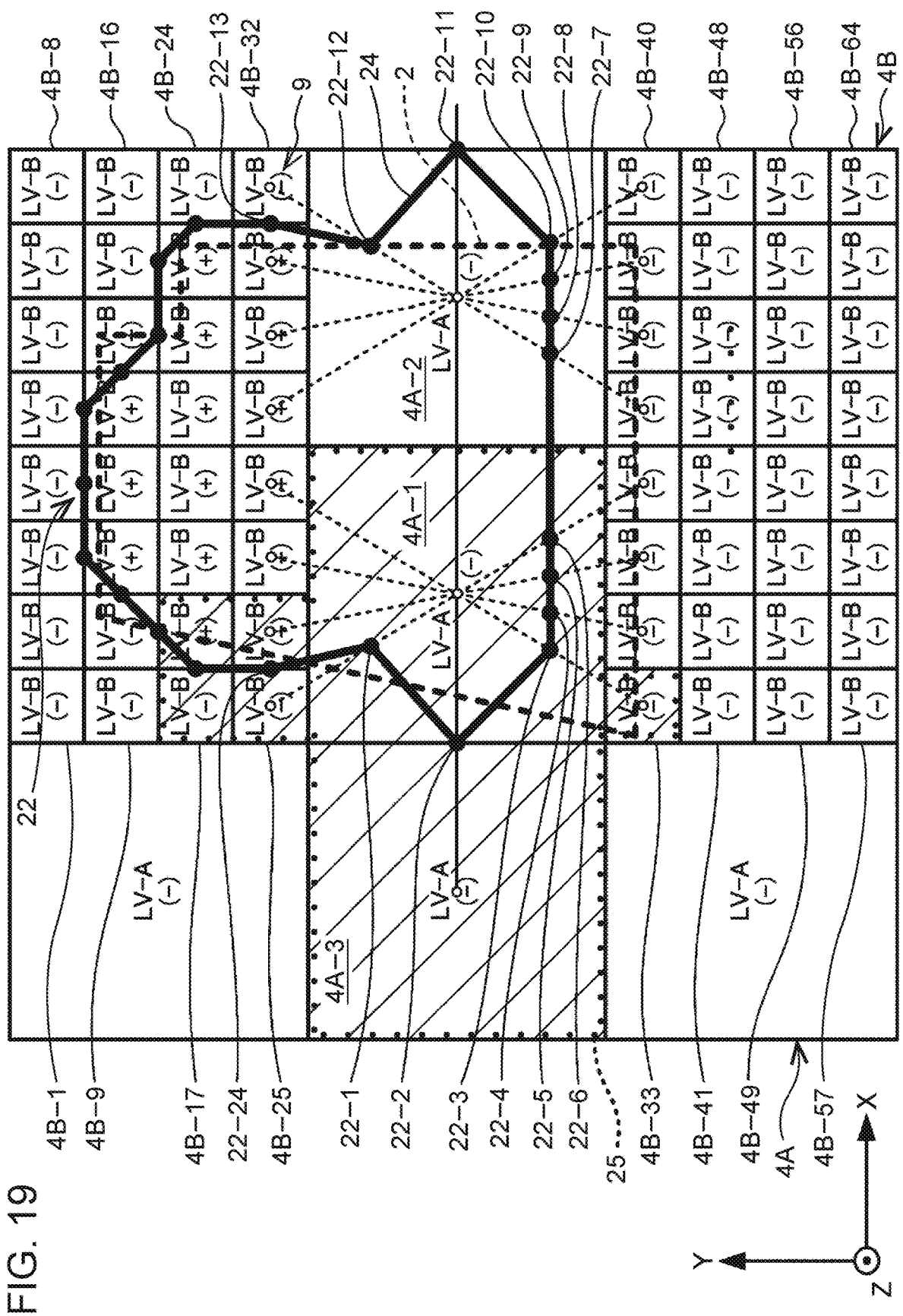
FIG. 19 is a diagram used for explaining a polygon correction process.

FIG. 19 is a diagram illustrating an example of voxel data and polygon data after the three-dimensional shape data process is performed. FIG. 19 is the same as FIG. 16. For example, explanation for the polygon correction process will be provided by paying attention to voxels 4 included in a region 25.

Figure 20:
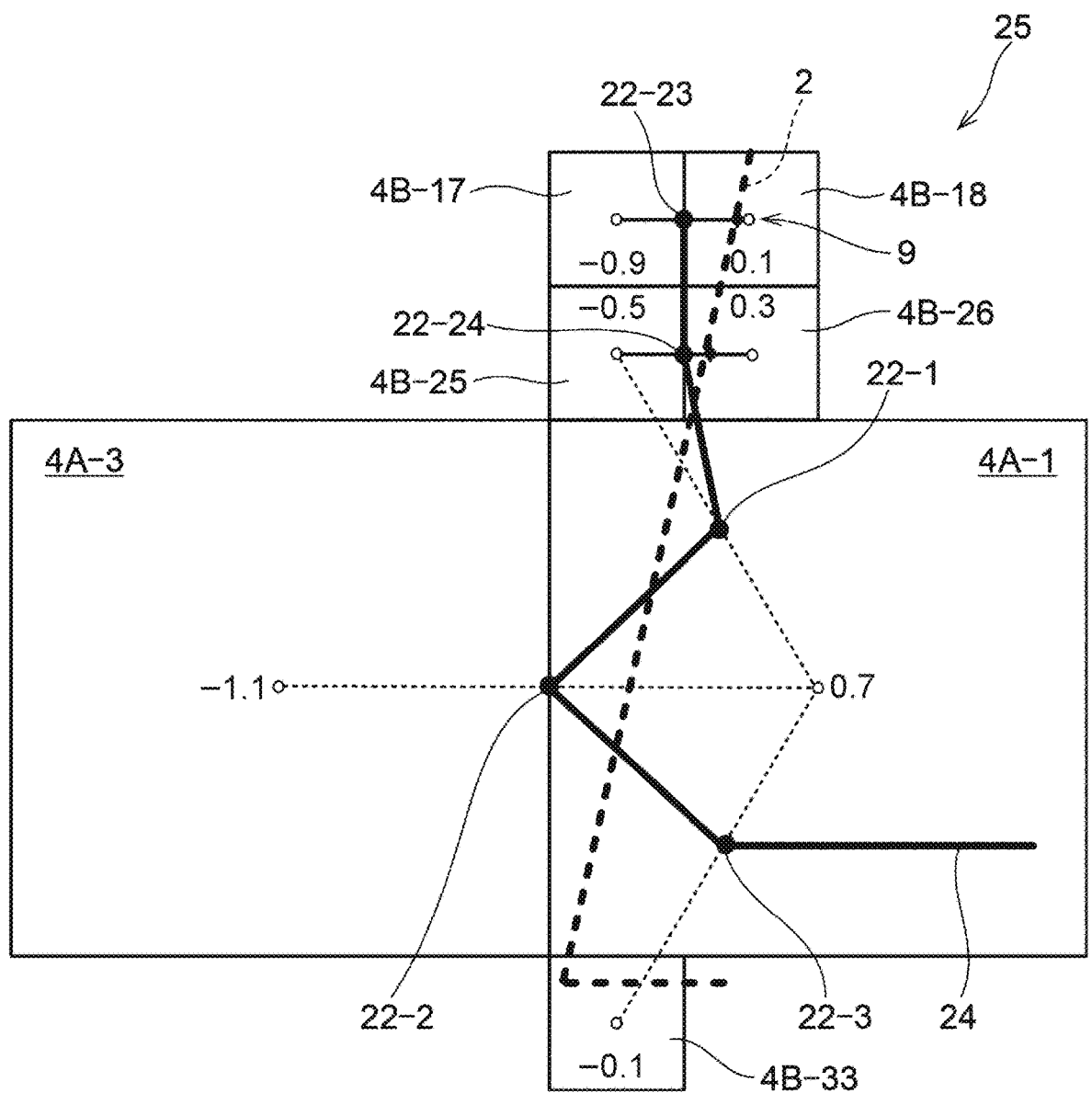
FIG. 20 is an enlarged diagram of voxels for which the polygon correction process is performed.

FIG. 20 is an enlarged diagram in which the voxels 4 included in the region 25 illustrated in FIG. 19 are enlarged. In FIG. 20, for each voxel 4, not only the sign but the absolute value of SDF is also indicated.

As illustrated in FIG. 20, in the three-dimensional shape data process, MC vertices 22 of a polygon 6 are each arranged at the border of an ON-state voxel 4 and an OFF-state voxel 4, that is, at the midpoint of a side connecting center points 9 of the voxels 4 that are adjacent to each other inside and outside the shape of the object 2. That is, in the three-dimensional shape data process, the CPU 11 sets the MC vertices 22 of the polygon 6 at positions each obtained by dividing a side connecting the center points 9 of the voxels 4 that are adjacent to each other inside and outside the shape of the object 2 at the ratio of 5:5.

In contrast, in the polygon correction process, for a side connecting the center points 9 of the voxels 4 that are adjacent to each other inside and outside the shape of the object 2, the positions of the MC vertices 22 of the polygon 6 are each corrected in accordance with the distance from the center points 9 of the adjacent voxels 4 to a surface of the object 2, that is, the ratio of absolute values of SDF associated with the voxels 4.

Figure 21:
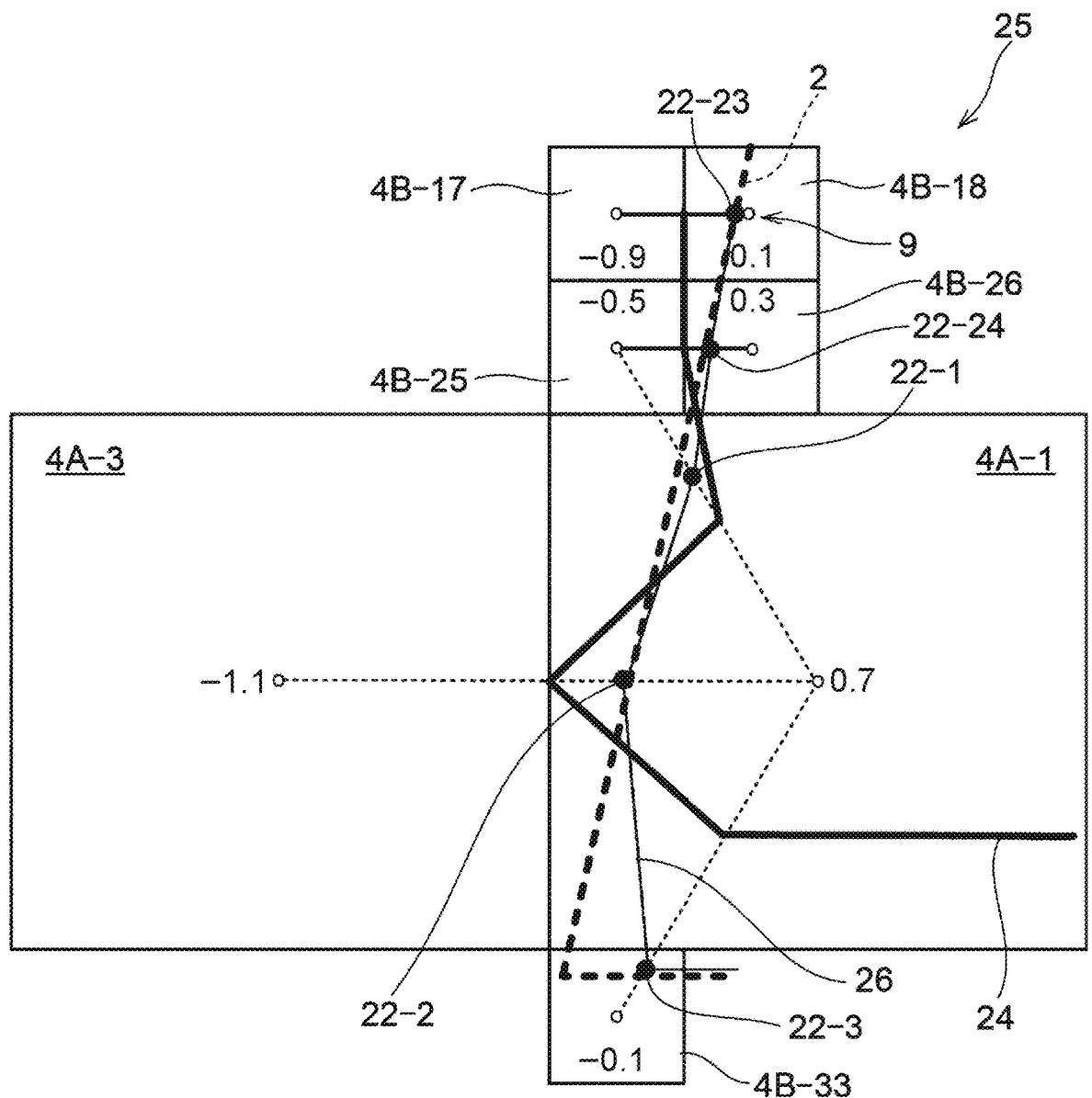
FIG. 21 is a diagram illustrating an example of a result of execution of the polygon correction process.

In the example illustrated in FIG. 21, the absolute values of SDF of the OFF-state voxel 4B-17 and the ON-state voxel 4B-18 are 0.9 and 0.1, respectively. Thus, the CPU 11 corrects the position of the MC vertex 22-23 such that the MC vertex 22-23 is arranged at a position that divides the side connecting the center point 9 of the voxel 4B-17 to the center point 9 of the voxel 4B-18 at the ratio of 9:1. In a similar manner, for example, the absolute values of SDF of the OFF-state voxel 4B-25 and the ON-state voxel 4A-1 are 0.5 and 0.7, respectively. Thus, the CPU 11 corrects the position of the MC vertex 22-1 such that the MC vertex 22-1 is arranged at a position that divides the side connecting the center point 9 of the voxel 4B-25 to the center point 9 of the voxel 4A-1 at the ratio of 5:7.

By correcting the position of each of the MC vertices 22 as described above, a corrected outline 26 representing the shape of the object 2 is obtained, as illustrated in FIG. 21. As is clear from FIG. 21, by performing the polygon correction process, the outline 26 is closer to the outline of the actual shape of the object 2 than the outline 24 of the shape of the object 2 obtained by the three-dimensional shape data process is.

In the case where a polygon 6 that does not have an area is generated as a result of correction of the position of an MC vertex 22 by the polygon correction process, the CPU 11 may delete the polygon 6 that does not have an area from the unit shape 8.

Although explanation for the three-dimensional shape data process is provided above based on the assumption that three-dimensional shape data representing the shape of the object 2 is present in space, polygon data of the object 2 may be generated based on distribution of attributes in the space with which attribute values for the object 2 are associated.

Figure 22:
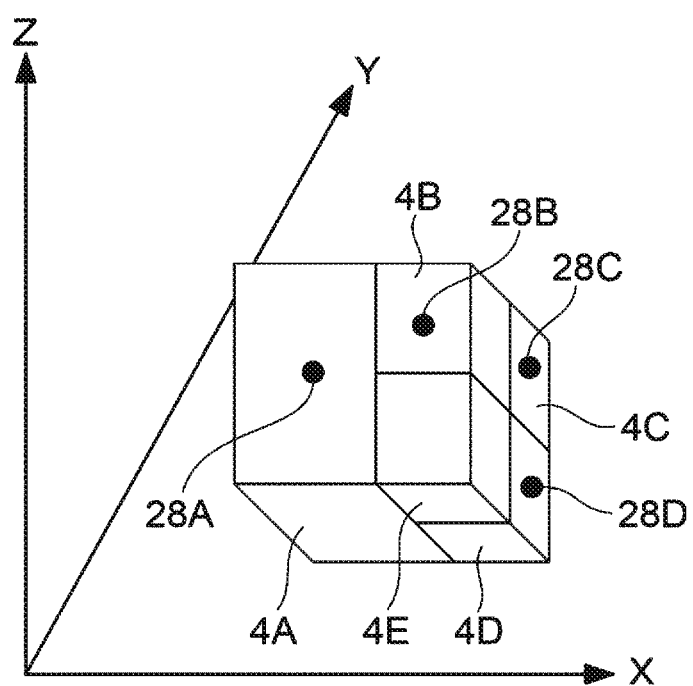
FIG. 22 is a diagram illustrating an example of attribute distribution.

FIG. 22 is a diagram illustrating an example of a state of distribution of attribute points 28 that are associated with attributes at points in the space represented by three-dimensional coordinates. Attribute values are associated with the individual attribute points 28 (in the example of FIG. 22, attribute points 28A, 28B, 28C, and 28D). An attribute value of a corresponding attribute is present at the coordinates at which an attribute point 28 is positioned. That is, no attribute is present at the coordinates at which no attribute point 28 is present. There is no constraint on the type of attribute associated with an attribute point 28. For example, SDF or temperature distribution may be associated with attribute points 28.

The CPU 11 divides the space where the attribute distribution is present into a plurality of voxels 4 at least one of which has a size different from another voxel 4. The CPU 11 uses the MC method for the space that has been divided as described above, and the shape of the object 2 is obtained from the attribute distribution.

That is, the CPU 11 sequentially sets determination regions 7 for voxels 4 into which the space has been divided, and extracts a unit shape 8 for each of the determination regions 7. As described above, to extract all the unit shapes 8 of different types without missing or repeating any unit shape from voxel data, the CPU 11 sequentially scans all the voxels 4 composing the voxel data, extracts all the reference vertices 3 included in the voxel data on the basis of the positional relationship between the voxels 4, and sets, for each of the reference vertices 3, all the voxels 4 that are in contact with the reference vertex 3 as a determination region 7 corresponding to the reference vertex 3.

According to the state of division of the space that has been divided into voxels 4, the voxels 4 are categorized into a voxel 4 including an attribute point 28 and a voxel 4 not including an attribute point 28. The CPU 11 treats a voxel 4 including an attribute point 28 as an ON-state 4 and treats a voxel 4 not including an attribute point 28 as an OFF-state voxel 4. In the example of FIG. 22, the voxels 4A, 4B, 4C, and 4D are treated as ON-state voxels 4, and the voxel 4E is treated as an OFF-state voxel 4.

The CPU 11 generates a flat face by allocation to the unit shape 8 on the basis of a state pattern of the voxels 4 composing the determination region 7 and achieving consistency.

As described above, by dividing the space where the attribute distribution is present into a plurality of voxels 4 at least one of which has a size different from another voxel 4 and performing the three-dimensional shape data process illustrated in FIG. 7 for the divided voxel data, the shape of the object 2 represented by polygons 6 is obtained based on the attribute distribution.

Exemplary embodiments of the present disclosure have been described above. However, the present disclosure is not limited to the exemplary embodiments described above. Various changes or improvements may be made to exemplary embodiments without departing from the scope of the present disclosure, and aspects to which the changes or improvements have been made are also encompassed within the technical scope of the present disclosure. For example, order of processing steps may be changed without departing from the scope of the present disclosure.

In an exemplary embodiment, an example in which the three-dimensional shape data process is implemented by software is described. However, a process equivalent to the process represented by the flowchart illustrated in FIG. 7 may be implemented in, for example, an application specific integrated circuit (ASIC), a field programmable gate array (FPGA), or a programmable logic device (PLD) and may be processed by hardware. In this case, compared to the case where the three-dimensional shape data process is implemented by software, the processing speed may be increased.

As described above, the CPU 11, which is an example of a general-purpose processor, may be replaced with a dedicated processor specialized in specific processing, such as the ASIC, the FPGA, the PLD, a graphic processing unit (GPU), or a floating point unit (FPU).

Furthermore, operation of a processor according to an exemplary embodiment may not be implemented by a single CPU 11 but may be implemented by a plurality of processors. Moreover, operation of a processor according to an exemplary embodiment may be implemented by processors included in a plurality of computers 10 in collaboration which are located physically apart from each other.

In an exemplary embodiment described above, the three-dimensional shape data processing program is installed in the ROM 12. However, the present disclosure is not limited to this. The three-dimensional shape data processing program may be recorded in a computer-readable recording medium and provided. For example, the three-dimensional shape data processing program may be recorded in an optical disk such as a compact disc (CD)-ROM or a digital versatile disc (DVD)-ROM and provided. Furthermore, the three-dimensional shape data processing program may be recorded in a portable semiconductor memory such as a universal serial bus (USB) or a memory card and provided.

Furthermore, the processing apparatus 1 may acquire a three-dimensional shape data processing program according to an exemplary embodiment through the communication unit 19 from an external apparatus connected to the communication line.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A three-dimensional shape data processing apparatus comprising:
   a processor configured to
      receive three-dimensional shape data represented by dividing a space including an object into a plurality of three-dimensional regions, at least one of the plurality of three-dimensional regions having a size different from another three-dimensional region, extract unit shapes from the space without missing or repeating any unit shape, the unit shapes each being formed by setting a predetermined position in each of the three-dimensional regions included in a three-dimensional region group formed of three-dimensional regions adjacent to each other as a vertex, allocate a plurality of polygons representing surfaces of the object, each polygon being allocated to a respective one of the extracted unit shapes, and configure a formation face, based on the plurality of polygons, such that a midpoint of a side connecting vertices of each of the polygons is defined as a new vertex, wherein in a case where the number of vertices of one of the unit shapes is less than a predetermined number of vertices, the processor allocates the formation face to the unit shape by assuming that overlap of at least one vertex of the unit shape and another vertex of the unit shape causes a side connecting the overlapping vertices to be contracted.

2. The three-dimensional shape data processing apparatus according to claim 1, wherein the processor extracts, as reference vertices, vertices of three-dimensional regions not positioned on an outer contour out of all the three-dimensional regions, and extracts a corresponding one of the unit shapes for each of reference three-dimensional region groups, the reference three-dimensional region groups each being formed of a predetermined number of three-dimensional regions that are in contact with a corresponding one of the reference vertices.

3. The three-dimensional shape data processing apparatus according to claim 2, wherein the predetermined position is set to a center of the three-dimensional region.

4. The three-dimensional shape data processing apparatus according to claim 1, wherein the predetermined position is set to a center of the three-dimensional region.

5. The three-dimensional shape data processing apparatus according to claim 1, wherein in a case where the formation face that does not have an area is allocated to the unit shape as a result of contraction of the side connecting the overlapping vertices of the unit shape, the processor deletes the formation face that does not have an area from the unit shape.

6. The three-dimensional shape data processing apparatus according to claim 1, wherein the processor does not allocate the formation face that does not have an area to the unit shape.

7. The three-dimensional shape data processing apparatus according to claim 1, wherein the processor corrects a position of a vertex of the formation face allocated to the unit shape in accordance with a ratio of distances from the predetermined positions in the three-dimensional regions adjacent to each other inside and outside a three-dimensional shape of the object represented by the formation face to the corresponding surface of the object.

8. The three-dimensional shape data processing apparatus according to claim 7, wherein in a case where the formation face does not have an area as a result of the correction of the position of the vertex of the formation face allocated to the unit shape, the processor deletes the formation face that does not have an area from the unit shape.

9. A three-dimensional shape data processing apparatus comprising:

a processor configured to receive an attribute distribution represented by dividing a space where attribute values are distributed into a plurality of three-dimensional regions, at least one of the plurality of three-dimensional regions having a size different from another three-dimensional region, extract unit shapes from the space without missing or repeating any unit shape, the unit shapes each being formed by setting a predetermined position in each of the three-dimensional regions included in a three-dimensional region group formed of three-dimensional regions adjacent to each other as a vertex, allocate a plurality of polygons representing surfaces of an object, each polygon being allocated to a respective one of the extracted unit shapes, and configure a shape of the object corresponding to the attribute distribution as a formation face, the formation face being configured based on the plurality of polygons, such that a midpoint of a side connecting vertices of each of the polygons is defined as a new vertex, wherein in a case where the number of vertices of the unit shape is less than a predetermined number of vertices, the processor allocates the formation face to the unit shape by assuming that overlap of at least one vertex of the unit shape and another vertex of the unit shape causes a side connecting the overlapping vertices to be contracted.

10. The three-dimensional shape data processing apparatus according to claim 9, wherein the processor extracts, as reference vertices, vertices of three-dimensional regions not positioned on an outer contour out of all the three-dimensional regions, and extracts a corresponding one of the unit shapes for each of reference three-dimensional region groups, the reference three-dimensional region groups each being formed of a predetermined number of three-dimensional regions that are in contact with a corresponding one of the reference vertices.

11. The three-dimensional shape data processing apparatus according to claim 9, wherein the predetermined position is set to a center of the three-dimensional region.

12. The three-dimensional shape data processing apparatus according to claim 9, wherein in a case where the formation face that does not have an area is allocated to the unit shape as a result of contraction of the side connecting the overlapping vertices of the unit shape, the processor deletes the formation face that does not have an area from the unit shape.

13. The three-dimensional shape data processing apparatus according to claim 9, wherein the processor does not allocate the formation face that does not have an area to the unit shape.

14. The three-dimensional shape data processing apparatus according to claim 9, wherein the processor corrects a position of a vertex of the formation face allocated to the unit shape in accordance with a ratio of distances from the predetermined positions in the three-dimensional regions adjacent to each other inside and outside a three-dimensional shape of the object represented by the formation face to the corresponding surface of the object.

15. The three-dimensional shape data processing apparatus according to claim 14, wherein in a case where the formation face does not have an area as a result of the correction of the position of the vertex of the formation face allocated to the unit shape, the processor deletes the formation face that does not have an area from the unit shape.

16. A non-transitory computer readable medium storing a program causing a computer to execute a process for three-dimensional shape data processing, the process comprising:
- receiving three-dimensional shape data represented by dividing a space including an object into a plurality of three-dimensional regions, at least one of the plurality of three-dimensional regions having a size different from another three-dimensional region,
- extracting unit shapes from the space without missing or repeating any unit shape, the unit shapes each being formed by setting a predetermined position in each of the three-dimensional regions included in a three-dimensional region group formed of three-dimensional regions adjacent to each other as a vertex,
- allocating a plurality of polygons representing surfaces of the object, each polygon being allocated to a respective one of the extracted unit shapes, and
- configuring a formation face, based on the plurality of polygons, such that a midpoint of a side connecting vertices of each of the polygons is defined as a new vertex, wherein
- in a case where the number of vertices of one of the unit shapes is less than a predetermined number of vertices, the process further comprises allocating the formation face to the unit shape by assuming that overlap of at least one vertex of the unit shape and another vertex of the unit shape causes a side connecting the overlapping vertices to be contracted.

* * * * *